US 9,604,502 B2

United States Patent
Kunugi et al.

(10) Patent No.: US 9,604,502 B2
(45) Date of Patent: *Mar. 28, 2017

(54) PNEUMATIC TIRE

(71) Applicant: The Yokohama Rubber Co., LTD., Minato-ku, Tokyo (JP)

(72) Inventors: Tsuyoshi Kunugi, Hiratsuka (JP); Koshi Iga, Hiratsuka (JP); Hideki Hamanaka, Hiratsuka (JP); Koichi Kotoku, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,357

(22) PCT Filed: Jun. 7, 2013

(86) PCT No.: PCT/JP2013/065846
§ 371 (c)(1),
(2) Date: Dec. 3, 2014

(87) PCT Pub. No.: WO2014/010351
PCT Pub. Date: Jan. 16, 2014

(65) Prior Publication Data
US 2015/0151581 A1    Jun. 4, 2015

(30) Foreign Application Priority Data

Jul. 13, 2012  (WO) .................. PCT/JP2012/068025
Jul. 13, 2012  (WO) .................. PCT/JP2012/068026
Jul. 13, 2012  (WO) .................. PCT/JP2012/068027

(51) Int. Cl.
*B60C 9/22*    (2006.01)
*B60C 9/20*    (2006.01)
(Continued)

(52) U.S. Cl.
CPC .................. *B60C 9/20* (2013.01); *B60C 3/04* (2013.01); *B60C 9/18* (2013.01); *B60C 9/185* (2013.01);
(Continued)

(58) Field of Classification Search
CPC .............. B60C 9/22; B60C 2009/2022; B60C 2009/2012; B60C 3/04
See application file for complete search history.

(56) References Cited

U.S. PATENT DOCUMENTS 3,557,858 A * 1/1971 Lugli .................... B60C 9/2006
152/187
3,939,890 A * 2/1976 Abe ......................... 152/209.14
(Continued)

FOREIGN PATENT DOCUMENTS

FR          1437569      *  5/1966
JP          63-068405    *  3/1988
(Continued)

OTHER PUBLICATIONS

English machine translation of FR1437569, dated May 1966.*
International Search Report for International Application No. PCT/JP2013/065846 dated Jul. 9, 2013, 4 pages, Japan.

*Primary Examiner* — Justin Fischer
*Assistant Examiner* — Robert Dye
(74) *Attorney, Agent, or Firm* — Thorpe North & Western

(57) ABSTRACT

In a pneumatic tire, a belt layer includes an inner-side cross belt and an outer-side cross belt having an absolute value of belt angle with respect to a tire circumferential direction of not less than 46 degrees and not more than 80 degrees and having belt angles with signs that are opposite to each other; and a circumferential reinforcing layer having a belt angle with respect to the tire circumferential direction within the range of ±5 degrees and disposed between the inner-side cross belt and outer-side cross belt. Also, a distance Gcc on (Continued)

a tire equatorial plane from a tread profile to a tire inner circumferential surface and a distance Gsh from a tread edge to the tire inner circumferential surface satisfy a relationship $1.10 \leq Gsh/Gcc$.

25 Claims, 15 Drawing Sheets

(51) Int. Cl.
- *B60C 9/28* (2006.01)
- *B60C 11/00* (2006.01)
- *B60C 11/13* (2006.01)
- *B60C 3/04* (2006.01)
- *B60C 9/18* (2006.01)
- *B60C 11/03* (2006.01)

(52) U.S. Cl.
CPC .............. *B60C 9/2006* (2013.04); *B60C 9/22* (2013.01); *B60C 9/28* (2013.01); *B60C 11/0083* (2013.04); *B60C 11/03* (2013.01); *B60C 11/0306* (2013.04); *B60C 11/1392* (2013.04); *B60C 2009/2012* (2013.04); *B60C 2009/2016* (2013.04); *B60C 2009/2019* (2013.04); *B60C 2009/2022* (2013.04); *B60C 2009/2041* (2013.04); *B60C 2009/2061* (2013.04); *B60C 2009/2064* (2013.04); *B60C 2009/2077* (2013.04); *B60C 2009/2083* (2013.04); *B60C 2009/283* (2013.04); *Y10T 152/10801* (2015.01)

(56) References Cited

U.S. PATENT DOCUMENTS

| | | | | |
|---|---|---|---|---|
| 4,215,734 A | * | 8/1980 | Suzuki | B60C 9/18 152/454 |
| 4,688,615 A | * | 8/1987 | Lee | 152/531 |
| 5,131,446 A | * | 7/1992 | Fukumoto | B60C 9/2006 152/526 |
| 6,659,147 B1 | * | 12/2003 | Cordonnier | B60C 9/22 152/526 |
| 9,259,971 B2 | * | 2/2016 | Hamanaka | B60C 11/0083 |
| 2004/0069392 A1 | * | 4/2004 | Maruoka et al. | 152/454 |
| 2006/0169380 A1 | | 8/2006 | Radulescu et al. | |
| 2006/0169381 A1 | | 8/2006 | Radulescu et al. | |
| 2006/0169383 A1 | | 8/2006 | Radulescu et al. | |
| 2007/0151643 A1 | * | 7/2007 | Takahashi | 152/209.1 |
| 2008/0156410 A1 | * | 7/2008 | Isobe | 152/531 |
| 2011/0192516 A1 | | 8/2011 | Yamaguchi et al. | |
| 2014/0166178 A1 | | 6/2014 | Sato | |
| 2014/0196826 A1 | | 7/2014 | Kobayashi | |
| 2014/0305566 A1 | | 10/2014 | Mashiyama | |
| 2014/0345766 A1 | | 11/2014 | Wang | |

FOREIGN PATENT DOCUMENTS

| | | | |
|---|---|---|---|
| JP | 03-099903 | * | 4/1991 |
| JP | 2006-111217 | | 4/2006 |
| JP | 2006-183211 | | 7/2006 |
| JP | 2009-001092 | | 1/2009 |
| JP | 4642760 | | 3/2011 |
| JP | 4642760 | | 4/2011 |
| JP | 4663638 | | 4/2011 |
| JP | 4663639 | | 4/2011 |
| JP | 4911267 | | 4/2012 |
| JP | 4918948 | | 4/2012 |
| JP | 4952864 | | 6/2012 |
| JP | 4973810 | | 7/2012 |
| WO | WO 2005/016666 | | 2/2005 |
| WO | WO 2005/016667 | | 2/2005 |
| WO | WO 2005/016668 | | 2/2005 |
| WO | WO 2010/041720 | | 4/2010 |

* cited by examiner

| | CONVENTIONAL EXAMPLE | COMPARATIVE EXAMPLE 1 | COMPARATIVE EXAMPLE 2 | COMPARATIVE EXAMPLE 3 | WORKING EXAMPLE 1 | WORKING EXAMPLE 2 |
|---|---|---|---|---|---|---|
| PRESENCE OF CIRCUMFERENTIAL REINFORCING LAYER | NONE | YES | YES | YES | YES | YES |
| BELT ANGLE OF CROSS BELTS (degrees) | 20 | 20 | 20 | 20 | 51 | 60 |
| Gsh/Gcc | 1.06 | 1.06 | 1.24 | 1.10 | 1.10 | 1.25 |
| PRESENCE OF LARGE ANGLE BELT | YES | NONE | NONE | NONE | NONE | NONE |
| De/Dcc | – | 1.00 | 1.00 | 1.06 | 1.06 | 1.06 |
| UDsh/GDsh | 0.17 | 0.17 | 0.17 | 0.17 | 0.17 | 0.17 |
| UDcc/GDcc | 0.17 | 0.17 | 0.17 | 0.17 | 0.17 | 0.17 |
| ΔDrg/UDsh | 0.0 | 0.0 | 0.0 | 0.0 | 0.0 | 0.0 |
| Drg/(GDsh+UDsh) | 0.65 | 0.65 | 0.65 | 0.65 | 0.65 | 0.65 |
| Ws/TW | – | 0.65 | 0.65 | 0.65 | 0.65 | 0.65 |
| TW/Wca | 0.93 | 0.93 | 0.93 | 0.93 | 0.93 | 0.93 |
| YIELD OF BASE TIRES (%) | 60 | 65 | 69 | 71 | 75 | 80 |

FIG. 16A

| | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 |
|---|---|---|---|---|---|---|---|---|
| PRESENCE OF CIRCUMFERENTIAL REINFORCING LAYER | YES | YES | YES | YES | YES | YES | YES | YES |
| BELT ANGLE OF CROSS BELTS (degrees) | 70 | 80 | 70 | 70 | 70 | 70 | 70 | 70 |
| Gsh/Gcc | 1.20 | 1.10 | 1.25 | 1.25 | 1.10 | 1.25 | 1.25 | 1.25 |
| PRESENCE OF LARGE ANGLE BELT | NONE | NONE | NONE | NONE | NONE | NONE | NONE | NONE |
| De/Dcc | 1.06 | 1.06 | 1.08 | 1.30 | 1.10 | 1.10 | 1.10 | 1.10 |
| UDsh/GDsh | 0.17 | 0.17 | 0.17 | 0.17 | 0.20 | 0.30 | 0.30 | 0.30 |
| UDcc/GDcc | 0.17 | 0.17 | 0.17 | 0.17 | 0.17 | 0.17 | 0.20 | 0.30 |
| ΔDrg/UDsh | 0.0 | 0.0 | 0.0 | 0.0 | 0.0 | 0.0 | 0.0 | 0.0 |
| Drg/(GDsh+UDsh) | 0.65 | 0.65 | 0.65 | 0.65 | 0.65 | 0.65 | 0.65 | 0.65 |
| Ws/TW | 0.65 | 0.65 | 0.65 | 0.65 | 0.65 | 0.65 | 0.65 | 0.65 |
| TW/Wca | 0.93 | 0.93 | 0.93 | 0.93 | 0.93 | 0.93 | 0.93 | 0.93 |
| YIELD OF BASE TIRES (%) | 82 | 74 | 83 | 85 | 82 | 84 | 86 | 87 |

FIG. 16B

| | WORKING EXAMPLE 11 | WORKING EXAMPLE 12 | WORKING EXAMPLE 13 | WORKING EXAMPLE 14 | WORKING EXAMPLE 15 | WORKING EXAMPLE 16 | WORKING EXAMPLE 17 | WORKING EXAMPLE 18 |
|---|---|---|---|---|---|---|---|---|
| PRESENCE OF CIRCUMFERENTIAL REINFORCING LAYER | YES | YES | YES | YES | YES | YES | YES | YES |
| BELT ANGLE OF CROSS BELT (degrees) | 70 | 70 | 70 | 70 | 70 | 70 | 70 | 70 |
| Gsh/Gcc | 1.25 | 1.25 | 1.25 | 1.25 | 1.25 | 1.25 | 1.25 | 1.10 |
| PRESENCE OF LARGE ANGLE BELT | NONE | NONE | NONE | NONE | NONE | NONE | NONE | NONE |
| De/Dcc | 1.10 | 1.10 | 1.10 | 1.10 | 1.10 | 1.10 | 1.10 | 1.10 |
| UDsh/GDsh | 0.30 | 0.30 | 0.30 | 0.30 | 0.30 | 0.30 | 0.30 | 0.30 |
| UDcc/GDcc | 0.30 | 0.30 | 0.20 | 0.30 | 0.30 | 0.30 | 0.30 | 0.30 |
| ΔDrg/UDsh | 1.0 | -1.0 | 0.0 | 0.0 | 0.0 | 0.0 | 0.0 | 0.0 |
| Drg/(CGDsh+UDsh) | 0.65 | 0.65 | 0.70 | 0.70 | 0.90 | 1.10 | 1.20 | 0.90 |
| Ws/TW | 0.65 | 0.65 | 0.65 | 0.65 | 0.65 | 0.65 | 0.65 | 0.70 |
| TW/Wca | 0.93 | 0.93 | 0.93 | 0.93 | 0.93 | 0.93 | 0.93 | 0.93 |
| YIELD OF BASE TIRES (%) | 92 | 85 | 95 | 98 | 98 | 98 | 98 | 100 |

FIG. 17A

| | WORKING EXAMPLE 19 | WORKING EXAMPLE 20 | WORKING EXAMPLE 21 | WORKING EXAMPLE 22 | WORKING EXAMPLE 23 | WORKING EXAMPLE 24 | WORKING EXAMPLE 27 | WORKING EXAMPLE 28 |
|---|---|---|---|---|---|---|---|---|
| PRESENCE OF CIRCUMFERENTIAL REINFORCING LAYER | YES | YES | YES | YES | YES | YES | YES | YES |
| BELT ANGLE OF CROSS BELT (degrees) | 70 | 70 | 70 | 70 | 70 | 70 | 70 | 70 |
| Gsh/Gcc | 1.20 | 1.25 | 1.25 | 1.25 | 1.25 | 1.10 | 1.25 | 1.25 |
| PRESENCE OF LARGE ANGLE BELT | NONE | NONE | NONE | NONE | NONE | NONE | NONE | NONE |
| De/Dcc | 1.10 | 1.10 | 1.10 | 1.10 | 1.10 | 1.10 | 1.10 | 1.10 |
| UDsh/GDsh | 0.30 | 0.30 | 0.30 | 0.30 | 0.30 | 0.30 | 0.30 | 0.30 |
| UDcc/GDcc | 0.30 | 0.30 | 0.30 | 0.30 | 0.30 | 0.30 | 0.30 | 0.30 |
| ΔDrg/UDsh | 0.0 | 0.0 | 0.0 | 0.0 | 0.0 | 0.0 | 0.0 | 0.0 |
| Drg/(CGDsh+UDsh) | 0.90 | 0.90 | 0.90 | 0.90 | 0.90 | 0.90 | 0.90 | 0.90 |
| Ws/TW | 0.70 | 0.70 | 0.80 | 0.90 | 0.95 | 0.95 | 0.95 | 0.95 |
| TW/Wca | 0.93 | 0.93 | 0.93 | 0.93 | 0.93 | 0.93 | 0.91 | 0.82 |
| YIELD OF BASE TIRES (%) | 100 | 100 | 100 | 100 | 100 | 100 | 100 | 100 |

FIG. 17B

PNEUMATIC TIRE

TECHNICAL FIELD

The present technology relates to a pneumatic tire, and more particularly relates to a pneumatic tire that can improve the yield of base tires used in retreaded tires.

BACKGROUND

Heavy duty tires with low aspect ratios mounted on trucks, buses and the like demonstrate reduction of tire radial growth in the center region, and demonstrate uniformity of contact pressure distribution in the tire width direction, due to the disposition of a circumferential reinforcing layer in the belt layer. Conventional pneumatic tires that are configured in this manner are disclosed in Japanese Patent Nos. 4642760B, 4663638B and 4663639B, as well as in Japanese Unexamined Patent Application Publication Nos. 2009-1092A, 2006-111217A and 2006-183211A.

Also, in recent years, there has been increased interest in retreading tires from the cost and environmental aspects. Retreaded tires are tires in which the tread rubber of the tire is replaced when the residual grooves reach the end of their life, and are manufactured by one of two methods: the precure method or the remold method. Retreaded tires made by the precure method are manufactured by forming a base tire by removing the used tread rubber by a buffing process, and laminating a vulcanized precured tread having the tread pattern of a new product onto the base tire. Retreaded tires made by the remolding method are manufactured by forming a base tire by removing the used tread rubber by a buffing process, wrapping unvulcanized tread rubber around the base tire, and vulcanization molding using a forming mold having the tread pattern.

In these retreaded tires, there is a demand to increase the yield of base tires.

SUMMARY

The present technology provides a pneumatic tire capable of improving the yield of base tires used in retreaded tires.

A pneumatic tire according to the present technology is a pneumatic tire including: a carcass layer; a belt layer disposed on an outer side of the carcass layer in a tire radial direction; tread rubber disposed on the outer side of the belt layer in the tire radial direction; at least three circumferential main grooves extending in a tire circumferential direction; and a plurality of land portions partitioned and formed by the circumferential main grooves, the belt layer including an outer-side cross belt and an inner-side cross belt having an absolute value of belt angle of not less than 46° and not more than 80° and having belt angles of mutually opposite signs; and a circumferential reinforcing layer having a belt angle within the range ±5° with respect to the tire circumferential direction and disposed between the inner-side cross belt and the outer-side cross belt, and a distance Gcc on a tire equatorial plane from a tread profile and a tire inner circumferential surface and a distance Gsh from a tread edge to the tire inner circumferential surface satisfying a relationship 1.10≤Gsh/Gcc.

In the pneumatic tire according to the present technology, the pair of cross belts function as a large angle belt, maintaining the stiffness in the tire width direction. Also, the circumferential reinforcing layer and the supplemental belt function as a low angle belt, maintaining the stiffness in the tire circumferential direction. Accordingly, the balance of stiffness in the tire circumferential direction and the tire width direction is appropriately adjusted, so deformation of the tread portion with time is reduced. Accordingly, the yield of base tires when retreading tires is increased, which has the advantage that the tire retreading performance is improved.

BRIEF DESCRIPTION OF THE DRAWINGS

FIGS. 16A-16B include a table showing results of performance testing of pneumatic tires according to embodiments of the present technology.

FIGS. 17A-17B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

[Pneumatic Tire]

Figure 1:
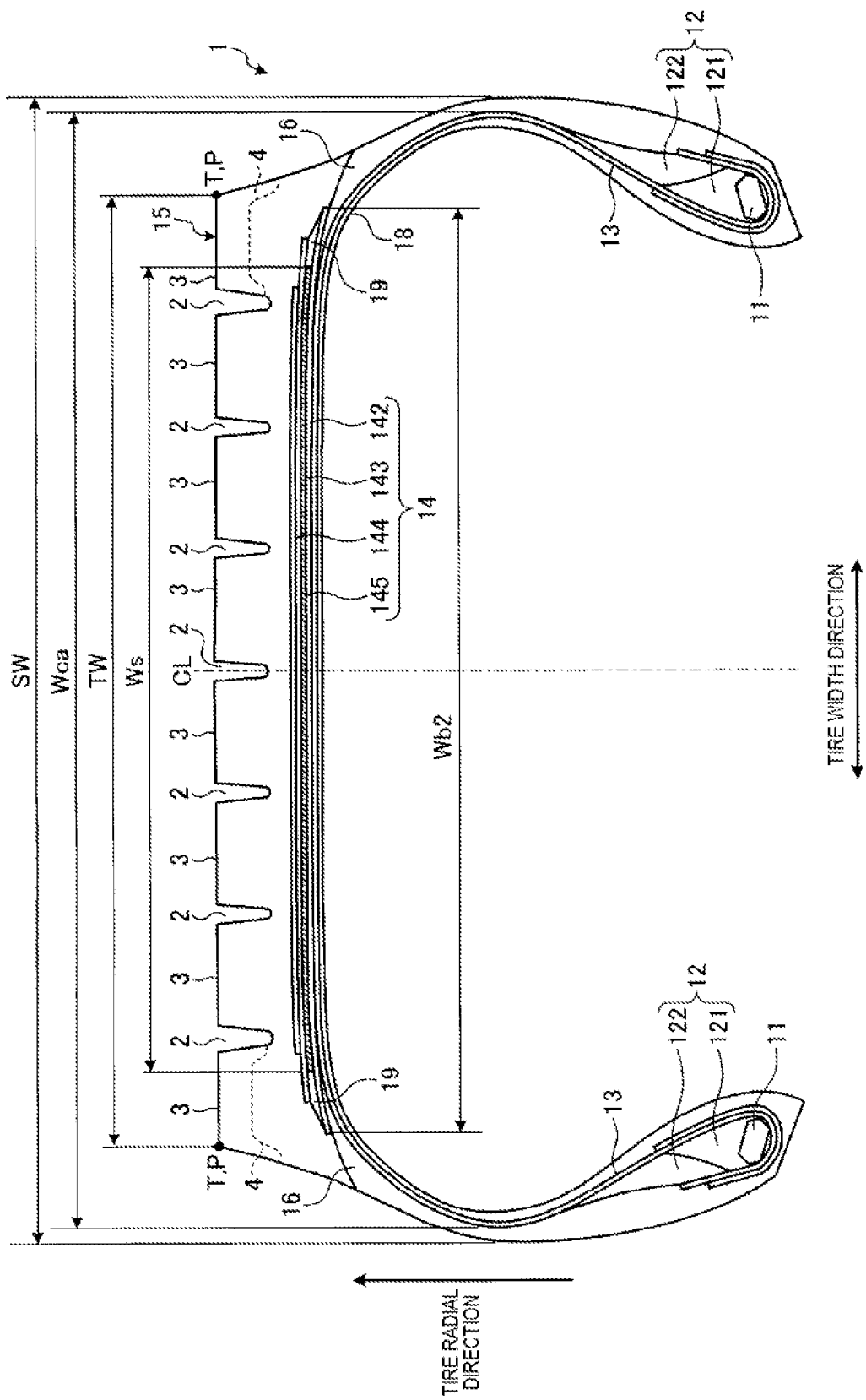
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and constitute cores of left and right bead portions. The pair of bead fillers 12, 12 are formed from a lower filler 121 and an upper filler 122, and are disposed on a periphery of each of the pair of bead cores 11, 11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a plurality of belt plies 142, 143, 144, 145, and disposed to extend over a periphery of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16, 16 is disposed on each outer side of the carcass layer 13 in the tire width direction, so as to form left and right sidewall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. Also, each of the land portions 3 is formed of a row of blocks that are segmented in the circumferential direction by ribs or a plurality of lug grooves that continue in the tire circumferential direction (not shown).

"Circumferential main grooves" refers herein to circumferential grooves having a groove width of 5.0 mm or greater. The groove widths of the circumferential main grooves are measured excluding notched portions and/or chamfered portions formed at the groove opening portion.

Furthermore, in the pneumatic tire 1, the circumferential main grooves 2, 2 on the left and right sides on the outermost side in the tire width direction are referred to as the outermost circumferential main grooves. Moreover, the land portions 3, 3 in the tire width direction outer side that are partitioned by the outermost circumferential main grooves 2, 2 on the left and right sides are referred to as shoulder land portions.

[Belt Layer]

Figure 2:
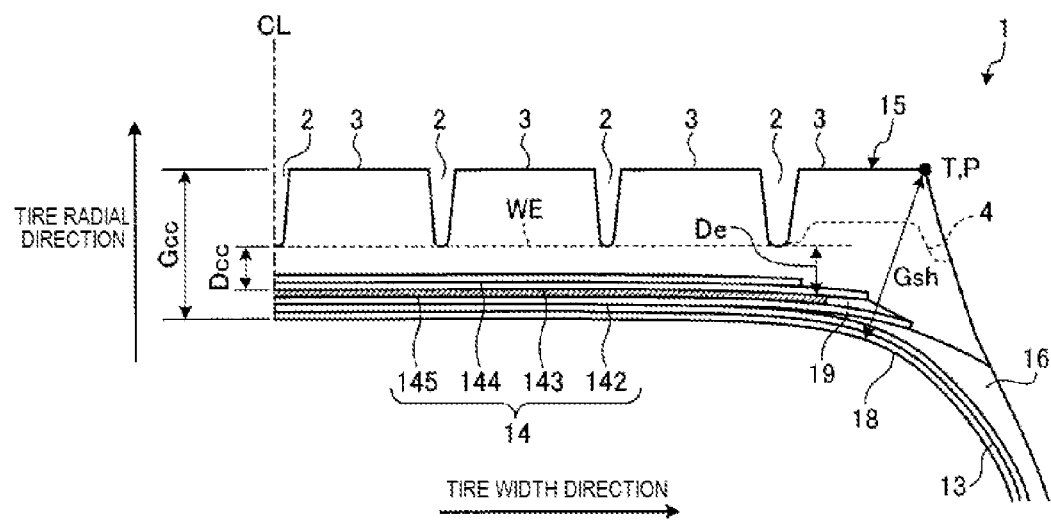
FIG. 2 is an explanatory view illustrating a belt layer of the pneumatic tire depicted in FIG. 1.
Figure 3:
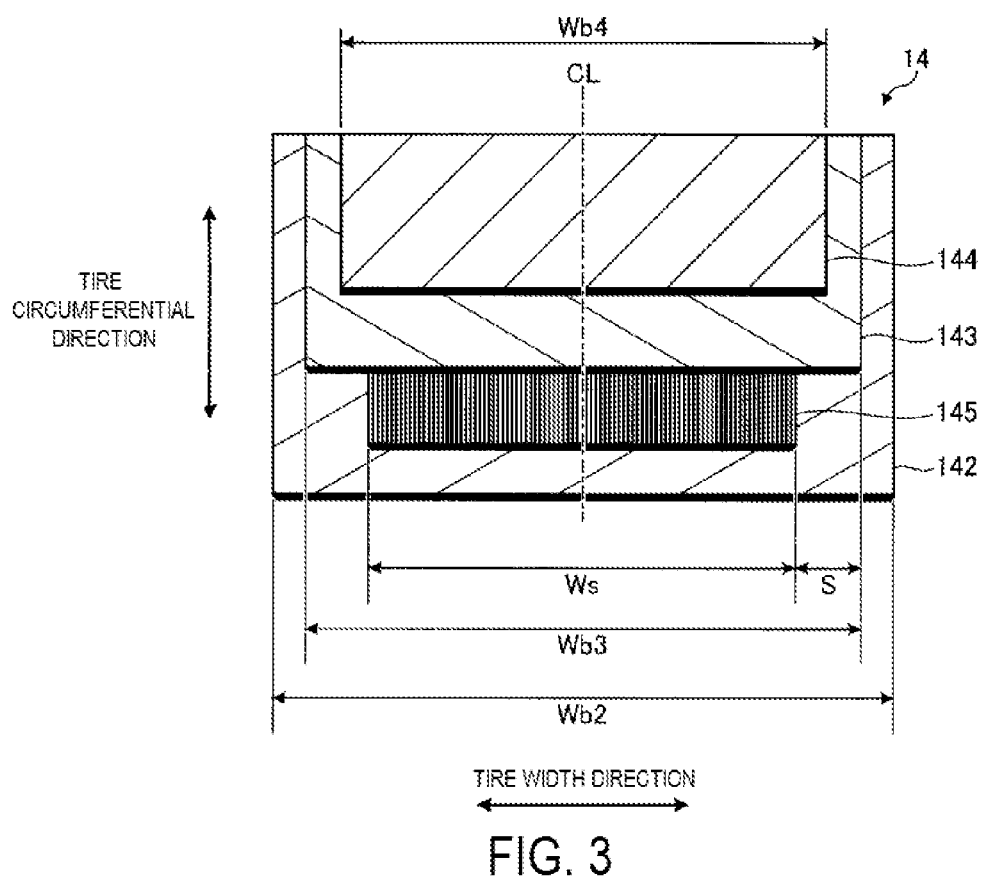
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. In FIG. 3, the fine lines in each of the belt plies 142 to 145 schematically represent the belt cords of each of the belt plies 142 to 145.

The belt layer 14 is formed by laminating a pair of cross belts 142, 143, a supplemental belt (low-angle belt) 144, and a circumferential reinforcing layer 145, wound around the periphery of the carcass layer 13 (see FIG. 2).

The pair of cross belts 142, 143 is configured by a plurality of belt cords formed from steel or organic fibers, covered with coating rubber, and subjected to a rolling process. Also, preferably, the pair of cross belts 142, 143 has a belt angle of not less than 46° and not more than 80° in absolute values (the angle of inclination of the fiber direction of the belt cords with respect to the tire circumferential direction), and more preferably have an angle of not less than 51° and not more than 70°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not shown).

Also, the supplemental belt 144 is configured from a plurality of belt cords made from steel or organic fibers covered with coating rubber, and subjected to a rolling process. Preferably, the supplemental belt 144 has a belt angle of not less than 10° and not more than 45° in absolute values, and more preferably has a belt angle of not less than 15° and not more than 30°. Also, the supplemental belt 144 is disposed laminated on the outer side in the tire radial direction of the pair of cross belts 142, 143. In the configuration of FIG. 1, the supplemental belt 144 also functions as a belt cover of the outer-side cross belt 143 laminated on the outermost side in the tire radial direction.

The circumferential reinforcing layer 145 is configured by belt cords formed from steel, and covered by coating rubber that are wound in a spiral manner with an inclination within a range of ±5° with respect to the tire circumferential direction. Specifically, the circumferential reinforcing layer 145 is formed by winding one or a plurality of wires in a spiral manner around the periphery of the inner-side cross belt 142. Additionally, the circumferential reinforcing layer 145 is disposed so as to be interposed between the pair of cross belts 142, 143. Moreover, the circumferential reinforcing layer 145 is disposed inward in the tire width direction of left and right edges of the pair of cross belts 142, 143. The stiffness in the tire circumferential direction is reinforced by the circumferential reinforcing layer 145.

In the pneumatic tire 1, the belt layer 14 may have an edge cover (not shown). Generally, the edge cover is configured by a plurality of belt cords formed from steel or organic fibers covered by coating rubber and subjected to a rolling process, having a belt angle, as an absolute value, of not less than 0° and not more than 5°. Additionally, edge covers are disposed outward in the tire radial direction of the left and right edges of the outer-side cross belt 143 (or the inner-side cross belt 142). As a result of the band effect of the edge cover, the difference in radial growth of a tread center region and a shoulder region is reduced.

Also, the inner-side cross belt 142 is disposed adjacent to the carcass layer 13. Therefore, the inner-side cross belt 142 is configured as the layer on the innermost side in the tire radial direction of the belt layer 14, and, no other belt ply is disposed between the inner-side cross belt and the carcass layer 13

Also, the inner-side cross belt 142 and the outer-side cross belt 143 are each adjacent to the circumferential reinforcing layer 145 and sandwich the circumferential reinforcing layer 145. Therefore, another belt ply is not disposed between the inner-side cross belt 142, the outer-side cross belt 143, and the circumferential reinforcing layer 145.

Furthermore, in the configuration of FIG. 2, the circumferential reinforcing layer 145 is disposed sandwiched between the pair of cross belts 142, 143 (see FIG. 2). However, this is not a limitation, and the circumferential reinforcing layer 145 may be disposed on the outer side in the tire radial direction of the pair of cross belts 142, 143 (not shown). Moreover, the circumferential reinforcing layer 145 may be disposed on the inner side in the tire radial direction of the pair of cross belts 142, 143 (not shown).

[Specific Configuration of the Supplemental Belt]

Also, in the pneumatic tire 1, the supplemental belt 144 and the outer-side cross belt 143 that are adjacent to each other have belt angles with opposite signs (see FIG. 3). For example, in the configuration in FIG. 3, the inclination of the belt cords of the supplemental belt 144 is downward and to the left, and, the inclination of the belt cords of the outer-side cross belt 143 is down and to the right. Therefore, the belt cords of the supplemental belt 144 and the belt cords of the outer-side cross belt 143 are inclined in opposite directions, so that their belt angles have different signs.

However this is not a limitation, and the belt cords of the supplemental belt 144 and the belt cords of the outer-side cross belt 143 may be inclined in the same direction, so that their belt angles have the same sign (not shown).

Furthermore, the supplemental belt 144 covers the disposal region of the outermost circumferential main grooves 2 (see FIG. 2). Specifically, the supplemental belt 144 is disposed over the whole region of the groove width of the outermost circumferential main grooves 2. The groove bottoms of the outermost circumferential main grooves 2 are thereby reinforced. If the supplemental belt 144 has a split structure (not shown), each divided portion of the supplemental belt 144 is disposed covering the whole region of the outermost circumferential main grooves 2.

Moreover, the width Wb4 of the supplemental belt 144 and the width Wb3 of the outer-side cross belt 143 satisfy the relationship $0.75 \leq Wb4/Wb3 \leq 0.95$ (see FIG. 3). Therefore, the supplemental belt 144 is narrower than the outer-side cross belt 143. Also, the ratio Wb4/Wb3 preferably has the relationship $0.80 \leq Wb4/Wb3 \leq 0.90$.

Furthermore, the width Wb4 of the supplemental belt and the width Ws of the circumferential reinforcing layer 145 have the relationship $1.02 \leq Wb4/Ws$ (see FIG. 3). Therefore, the supplemental belt 144 is wider than the circumferential reinforcing layer 145. It is also preferable that the supplemental belt 144 extends to the tire width direction outer side of the outermost circumferential main grooves 2 (see FIG. 2). Furthermore, although there is no particular upper limit to the ratio Wb4/Ws, it is constrained by the relationship between the ratio Wb4/Wb3 and the ratio Ws/Wb3 which is described later.

The width of the belt plies is the distance in the tire rotational axis direction between the left and right ends of each of the belt plies, and measured when the tire is mounted on a regular rim and the regular inner pressure is applied under no load conditions.

Also, if a belt ply has a divided structure in the tire width direction (not shown), the width of the belt ply is measured as the distance between the tire width direction outer sides of the left and right divided portions.

Also, in a normal pneumatic tire 1, each belt ply has a left-right symmetric structure about the tire equatorial plane CL as center, as illustrated in FIG. 1. Therefore, the distance from the tire equatorial plane CL to the edge on the tire width direction outer side of a belt ply is half the width of the belt ply.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular inner pressure is an air pressure of 180 kPa, and the regular load is 88% of the maximum load capacity.

Also, the belt cords of the supplemental belt 144 are steel wires, and, the number of ends is not less than 15/50 mm and not more than 25/50 mm.

[Improvement in the Yield of Base Tires]

In recent years, heavy duty tires mounted on trucks and buses have a low aspect ratio and are provided with a circumferential reinforcing layer to maintain the shape of the tread portion. Specifically, the circumferential reinforcing layer is disposed in the center region of the tread portion, and maintains the shape of the tread portion by reducing radial growth of the tread portion by exhibiting a fastening effect.

In this configuration with a circumferential reinforcing layer, the stiffness of the belt layer in the tire circumferential layer is increased by the circumferential reinforcing layer, which has the problem that separation of the edge rubber at the edge portion of the belt plies can easily occur. This problem is particularly significant under high internal pressure, high applied loads, and long term use conditions.

Also, in recent years, there has been increased interest in retreading tires from the cost and environmental aspects. Retreaded tires are tires in which the tread rubber of the tire is replaced when the residual grooves reach the end of their life, and are manufactured by one of two methods: the precure method or the remold method. Retreaded tires made by the precure method are manufactured by forming a base tire by removing the used tread rubber by a buffing process, and laminating a vulcanized precured tread having the tread pattern of a new product onto the base tire. Retreaded tires made by the remolding method are manufactured by forming a base tire by removing the used tread rubber by a buffing process, wrapping unvulcanized tread rubber around the base tire, and vulcanization molding using a forming mold having the tread pattern.

Here, in the process of obtaining base tires, the buffing process is carried out on the used tire in the inflated condition. At this time, in particular for used tires having a low aspect ratio, the tire radial growth is large in the left and right shoulder regions. Therefore, the belt plies in the shoulder region can easily become exposed on the surface of the base tire due to the buffing process. Such a base tire cannot be used as a retreaded tire, so that it is necessary to provide a technique to increase the yield of base tires.

Furthermore, because base tires are obtained from used tires, in some cases, belt edge separation (separation of the surrounding rubber from the edge of the belt layer) occurs within the base tire. These base tires cannot be used as retreaded tires, so that it is necessary to have a technique to reduce the belt edge separation at the new product stage. It is not possible to identify belt edge separation within a base tire visually from outside the tire, so that inspection to determine whether or not belt edge separation occurs is carried out using special inspection equipment.

Regarding this point, in the pneumatic tire 1, the pair of cross belts 142, 143 function as a high angle belt, maintaining the stiffness in the tire width direction, as described above. Also, the circumferential reinforcing layer 145 and the supplemental belt 144 function as a low angle belt, maintaining the stiffness in the tire circumferential direction. Accordingly, the balance of stiffness in the tire circumferential direction and the tire width direction is appropriately adjusted, so that deformation of the tread portion with time is reduced. Accordingly, the yield of base tires when retreading tires is increased, and the tire retreading performance is improved.

[Tread Gauge]

Moreover, in the pneumatic tire 1, the distance Gcc on the tire equatorial plane CL from the tread profile to the tire inner circumferential surface and the distance Gsh from the tread edge P to the tire inner circumferential surface satisfies the relationship $1.10 \leq Gsh/Gcc \leq 1.50$. It is also preferable that the ratio Gsh/Gcc is within the range $1.20 \leq Gsh/Gcc \leq 1.50$.

The distance Gcc is measured as the distance from the point of intersection of the tire equatorial plane CL and the tread profile to the point of intersection of the tire equatorial plane CL and the tire inner circumferential surface, in a cross-sectional view in the tire meridian direction. Therefore, in a configuration in which a circumferential main groove 2 is on the tire equatorial plane CL, as illustrated in FIGS. 1 and 2, the distance Gcc is measured after excluding this circumferential main groove 2. The distance Gsh is measured as the length of the perpendicular line drawn from the tread edge P to the tire inner circumferential surface, in a cross-sectional view in the tire meridian direction.

In the configuration in FIG. 2, the pneumatic tire 1 includes an inner liner 18 on the inner circumferential surface of the carcass layer 13, and the inner liner 18 is disposed over the whole region of the tire inner circumferential surface. In this configuration, the distance Gcc and the distance Gsh are measured with reference to the surface of the inner liner 18 (tire inner circumferential surface).

Furthermore, as illustrated in FIG. 2, in the cross-sectional view in the tire meridian direction, the ultimate wear surface WE of the circumferential main groove 2 is drawn. The ultimate wear surface WE is the surface that the wear indicator of the tire is estimated from a wear indicator present in the tire. Also, the ultimate wear surface WE is measured on the tire on its own in the uninflated condition. In a normal pneumatic tire, the ultimate wear surface WE is a curved line that is substantially parallel to the tread profile.

In this case, the distance Dcc on the tire equatorial plane CL from the circumferential reinforcing layer 145 to the ultimate wear surface WE and the distance De from the edge of the circumferential reinforcing layer 145 to the ultimate wear surface WE have the relationship $0.95 \leq De/Dcc \leq 1.05$.

The distance Dcc and the distance De are measured on the tire on its own in the uninflated condition. Furthermore, the point of measurement on the circumferential reinforcing layer 145 side is defined as the curved line that connects the center points of the belt cords from which the circumferential reinforcing layer 145 is configured. Moreover, the edges of the circumferential reinforcing layer 145 are defined with reference to the belt cords on the outermost side in the tire width direction from among the belt cords from which the circumferential reinforcing layer 145 is configured.

Figure 4A:
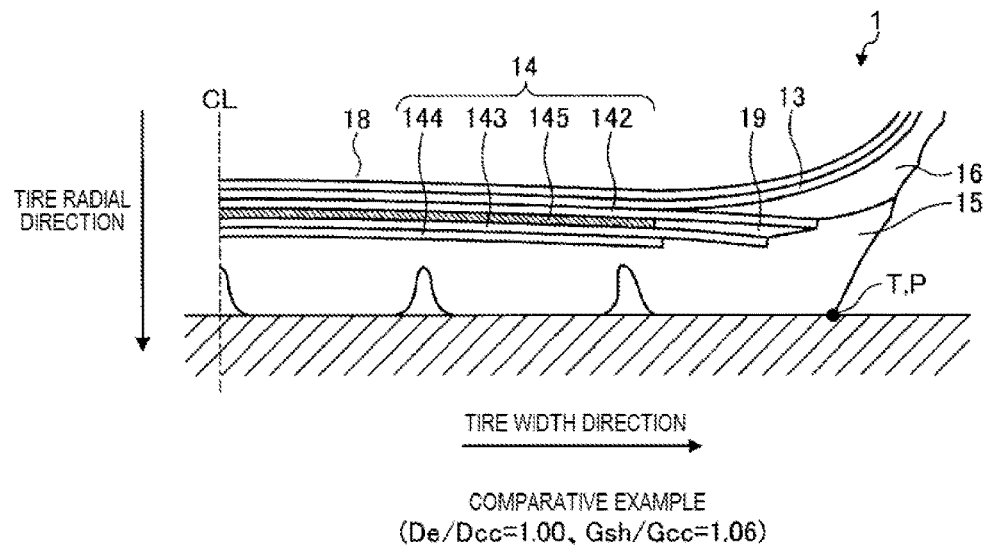
FIGS. 4A and 4B are explanatory views illustrating the action of the pneumatic tire depicted in FIG. 1.
Figure 4B:
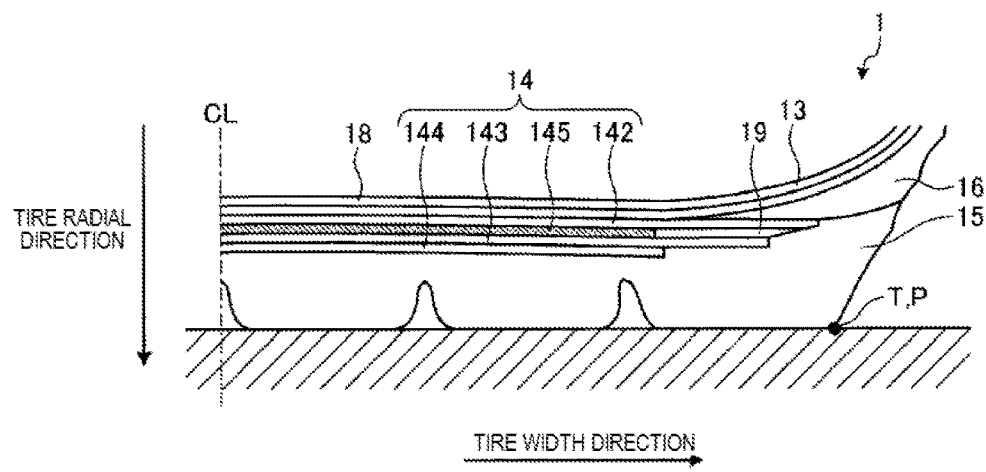

FIGS. 4A and 4B are explanatory views illustrating the action of the pneumatic tire depicted in FIG. 1. FIGS. 4A and 4B show the ground contact conditions of tires with different De/Dcc and Gsh/Gcc ratios.

In Comparative Example tire in FIG. 4A, the ratio De/Dcc is set to be equal to that in the configuration in FIGS. 1 to 3 (De/Dcc=1.00), and the ratio Gsh/Gcc is set to be smaller (Gsh/Gcc=1.06). In this configuration, in the state where the tire does not contact the ground, the tread profile has a drooping shoulder shape in which the outer diameter reduces from the tire equatorial plane CL towards the tread edge P (not shown). Therefore, during tire ground contact, the tread shoulder region is greatly deformed on the road surface side (the outer side in the tire radial direction), as illustrated in FIG. 4A. In this case, because the distances Dcc, De from the circumferential reinforcing layer 145 to the ultimate wear surface WE are uniform (De/Dcc=1.00), the edges of the circumferential reinforcing layer 145 follow the deformation of the tread portion shoulder regions on the road surface side (the outer side in the tire radial direction) and are greatly bent. Therefore, the strain in the circumferential reinforcing layer 145 when the tire makes ground contact is large.

In contrast, in the tire of Working Example in FIG. 4B, the ratio De/Dcc in the configuration in FIGS. 1 to 3 is set large (De/Dcc=1.08), and the ratio Gsh/Gcc is set large (Gsh/Gcc=1.20). In this configuration, the difference in diameter between the outer diameter of the tread profile at the tire equatorial plane CL and at the tread edge P is small, so that overall the tread profile has a flat shape (substantially parallel to the tire rotational axis) (see FIGS. 1 and 2). Therefore, when the tire makes ground contact, the amount of deformation of the tread portion shoulder regions is small, as illustrated in FIG. 4B. In addition, the distances Dcc, De from the circumferential reinforcing layer 145 to the ultimate wear surface WE satisfy the relationship De<Dcc, so that compared with a configuration in which the ratio De/Dcc is substantially equivalent, the ground contact surface pressure of the shoulder land portions when the tire makes ground contact increases.

If the pneumatic tire 1 is to be reused as a retreaded tire, a portion of the tread rubber of the used tire is removed by a buffing process as described above, to obtain a base tire. In this buffing process, the amount of buffing (amount of tread rubber removed) is set so that (1) the surface of the groove bottom line of the circumferential main grooves 2 does not remain on the surface of the base tire, (2) the belt plies are not exposed on the surface of the base tire, and (3) shoulder wear (in particular, step wear) of the used tire does not remain on the surface of the base tire. Specifically, the amount of buffing is determined with reference to the groove depth GDcc in the vicinity of the tire equatorial plane CL, the groove depth GDsh of the outermost circumferential main groove 2, and the position of the opening ends 41 of the lug grooves 4 of the shoulder land portions 3 (see FIGS. 5 and 6).

In this case, in the configuration of FIG. 4B, the amount of deformation of the tread portion shoulder regions when the tire makes ground contact is small, as described above, so that the stiffness of the tread portion shoulder regions is maintained and the tire radial growth is reduced. Also, by increasing the ground contact surface pressure of the shoulder land portions when the tire makes ground contact, the radial growth of the tire in the region on the outer side in the tire radial direction from the circumferential reinforcing layer 145 is reduced. Accordingly, the deformation of the belt layer 14 is reduced, and exposure of the belt layer 14 during buffing of the used tire is reduced.

Moreover, as described above, by setting the ratio Gsh/Gcc large and giving the shoulder portions a thick structure, it is possible to prevent the belt plies from being exposed while properly ensuring the amount of buffing. Accordingly, the yield of base tires is improved.

[Groove Bottom Gauge]

Figure 5:
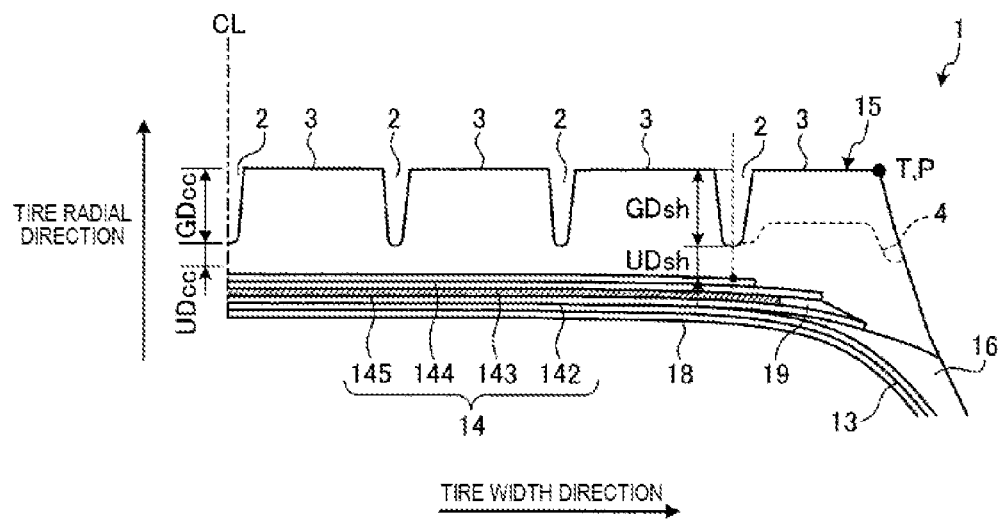
FIG. 5 is an enlarged cross-sectional view illustrating the shoulder portion of the pneumatic tire depicted in FIG. 1.

FIG. 5 is an explanatory view illustrating the pneumatic tire depicted in FIG. 1. FIG. 5 is a reproduction of FIG. 2 in which the dimensions and symbols necessary to explain the groove bottom gauge are newly added, instead of the dimensions and symbols shown in FIG. 2.

In this pneumatic tire 1, preferably the groove depth GDsh and the groove bottom gauge UDsh of the outermost circumferential main groove 2 satisfy the relationship $0.2 \leq \text{UDsh/GDsh}$.

Also, in FIG. 5, preferably the groove depth GDcc and the groove bottom gauge UDcc of the circumferential main groove 2 closest to the tire equatorial plane CL satisfy the relationship $0.15 \leq \text{UDcc/GDcc}$, and more preferably satisfies the relationship $0.20 \leq \text{UDcc/GDcc}$.

The groove depths GDsh, GDcc of the circumferential main grooves 2 are measured as the distances between the tread profile and the groove bottom (maximum depth position) of the circumferential main grooves 2. Also, the groove depths GDsh, GDcc are measured excluding any raised bottom portions such as a stone ejector or the like formed on the groove bottom. Also, the groove depths GDsh, GDcc depend on the tire size, but are normally set in the range of $10 \text{ mm} \leq \text{GDsh} \leq 25 \text{ mm}$ and $10 \text{ mm} \leq \text{GDcc} \leq 25 \text{ mm}$.

The groove bottom gauges UDsh, UDcc of the circumferential main grooves 2 are measured as the distance between the groove bottom of the circumferential main grooves 2 and the belt layer 14 (more specifically, the arc connecting the tops on the outer side in the tire radial direction of the belt cords of the belt ply on the outermost side in the tire radial direction).

In the case that there is a circumferential main groove 2 on the tire equatorial plane CL, the circumferential main groove 2 closest to the tire equatorial plane CL is that circumferential main groove 2 (see FIG. 5), and in the case that a land portion 3 is on the tire equatorial plane CL (there is no circumferential groove 2) (not shown), the circumferential main groove 2 closest to the tire equatorial plane CL is the circumferential main groove 2 from among the plurality of circumferential main grooves 2 in the position closest to the tire equatorial plane CL.

There is no particular upper limit on the ratios UDsh/GDsh and UDcc/GDcc, but if the groove bottom gauges UDsh, UDcc are excessive, the tread gauge increases and the tire rolling resistance is reduced, which is not desirable. Therefore, preferably the upper limits of the ratios UDsh/GDsh and UDcc/GDcc are appropriately set taking this point into consideration. Specifically, the ratios UDsh/GDsh and UDcc/GDcc are preferably in the ranges of $\text{UDsh/GDsh} \leq 0.7$ and $\text{UDcc/GDcc} \leq 0.7$.

Also, preferably the ratios UDsh/GDsh and UDcc/GDcc satisfy the relationship $\text{UDcc/GDcc} < \text{UDsh/GDsh}$. Therefore, the groove bottom gauge ratio UDsh/UDsh of the outermost circumferential main groove 2 is set larger than the groove bottom gauge ratio UDcc/UDcc of the circumferential main groove 2 closest to the tire equatorial plane CL. Accordingly, the groove depth GDsh, GDcc of each circumferential main groove 2 is appropriately adjusted, and it is possible to achieve a tread shape having the ratio Gsh/Gcc as described above.

Also, preferably the groove depth GDsh of the outermost circumferential main groove 2 and the groove depth GDcc of the circumferential main groove 2 closest to the tire equatorial plane CL satisfy the relationship $1.0 \leq \text{GDsh/GDcc} \leq 1.2$. Accordingly, the ratio GDsh/GDcc of the groove depths is appropriately adjusted.

In a configuration in which there are circumferential main grooves 2 between the circumferential main groove 2 closest to the tire equatorial plane CL and the outermost circumferential main groove 2 (see FIGS. 1 and 5), normally the groove depths and the groove bottom gauges of these circumferential main grooves 2 are appropriately set with reference to the groove depths GDsh, GDcc and the groove bottom gauges UDsh, UDcc as described above.

In the configuration as described above, since the groove bottom gauges UDsh, UDcc of the circumferential main grooves 2 are appropriately ensured, a sufficient amount of buffing can be obtained so that the shoulder wear of the used tire does not remain on the surface of the base tire. Accordingly, the yield of base tires is improved.

[Lug Grooves as Marks for Determining the Time for Retreading]

As described above, in a tire with a circumferential reinforcing layer in the belt layer, shoulder wear tends to easily occur. If this shoulder wear progresses greatly, it is not possible to remove the shoulder wear by the buffing process and the used tire cannot be retreaded. This is because if a large amount of buffing is carried out in order to remove the shoulder wear, the edge of the belt layer is exposed on the surface of the base tire.

On the other hand, normally it is determined whether a used tire can be retreaded or not, in other words, whether the edge of the belt layer is exposed on the surface of the base tire or not, after the buffing process. In this case, the buffing process would be wasted, which would cause a loss for the user (mainly, a tire dealer that carries out the buffing process), which is not desirable.

Therefore, the pneumatic tire 1 has the following configuration in order that the user can determine appropriately the time for retreading a tire.

FIGS. 6 to 9 are enlarged cross-sectional views illustrating the shoulder portion of the pneumatic tire depicted in FIG. 1. These drawings each illustrate the pneumatic tire 1 having the same structure, and also illustrate the condition of the shoulder portion when the tire is fitted to a standard rim, inflated with the regular inner pressure, under no load conditions.

Figure 6:
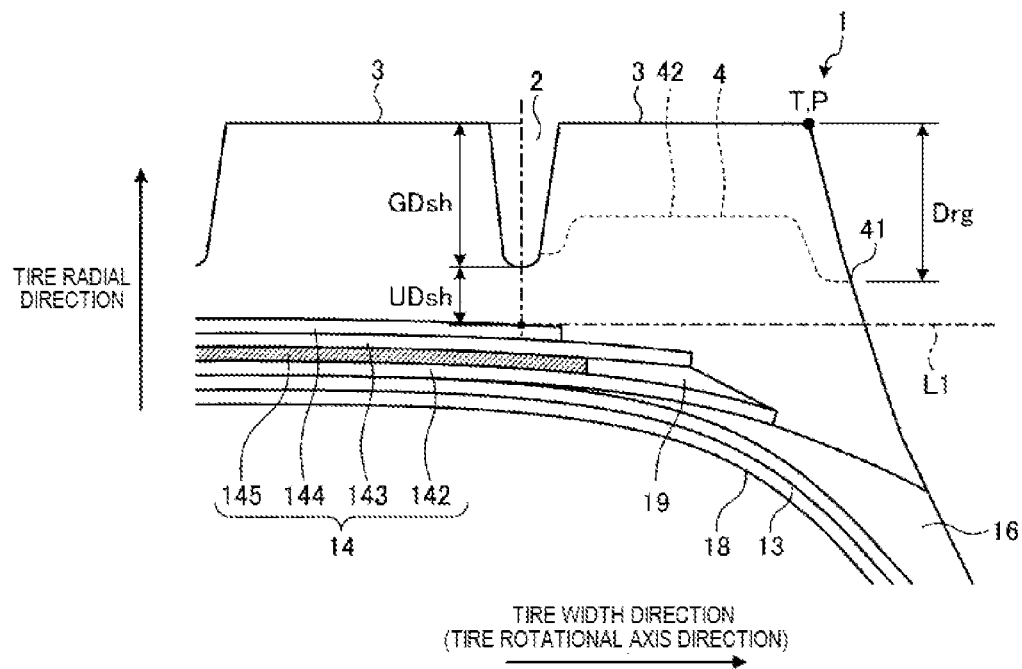
FIG. 6 is an enlarged cross-sectional view illustrating the shoulder portion of the pneumatic tire depicted in FIG. 1.

First, as illustrated in FIG. 6, a straight line L1 is drawn from that edge from among the edges of the plurality of belt plies 142 to 145 from which the belt layer 14 is configured, on the outermost side in the tire radial direction and on the outer side in the tire width direction from the outermost circumferential main groove 2 parallel to the tire rotational axis.

In this case, in the pneumatic tire 1, the opening end 41 of the lug groove 4 is disposed on the outer side in the tire radial direction from the straight line L1. Specifically, the opening end 41 of the lug groove 4 is preferably disposed at a distance of not less than 2 mm from the straight line L1. Also, the opening end 41 of the lug groove 4 is used as a mark for determining the time to retread the tire.

In this configuration, as wear progresses, shoulder wear occurs on the edge portion on the outer side in the tire width direction of the shoulder land portion 3. Also, before the shoulder wear reaches the opening end 41 of the lug groove 4, it is deemed that the used tire can be retreaded, and when the shoulder wear exceeds the opening end 41 of the lug groove 4, it is deemed that the tire cannot be retreaded. In other words, it is judged whether a tire can be retreaded or not by reference to whether or not the opening end 41 of the lug groove 4 has been eliminated by shoulder wear. Also, when the shoulder wear reaches the opening end 41 of the lug groove 4, it is the recommended time for retreading. In this state, the opening end 41 of the lug groove 4 is appropriately adjusted as described above, so it is possible to remove the shoulder wear portion by the buffing process while preventing exposure of the belt layer 14 on the surface of the base tire. Accordingly, the opening end 41 of the lug groove 4 functions as a mark for determining the time for retreading the tire.

Figure 7:
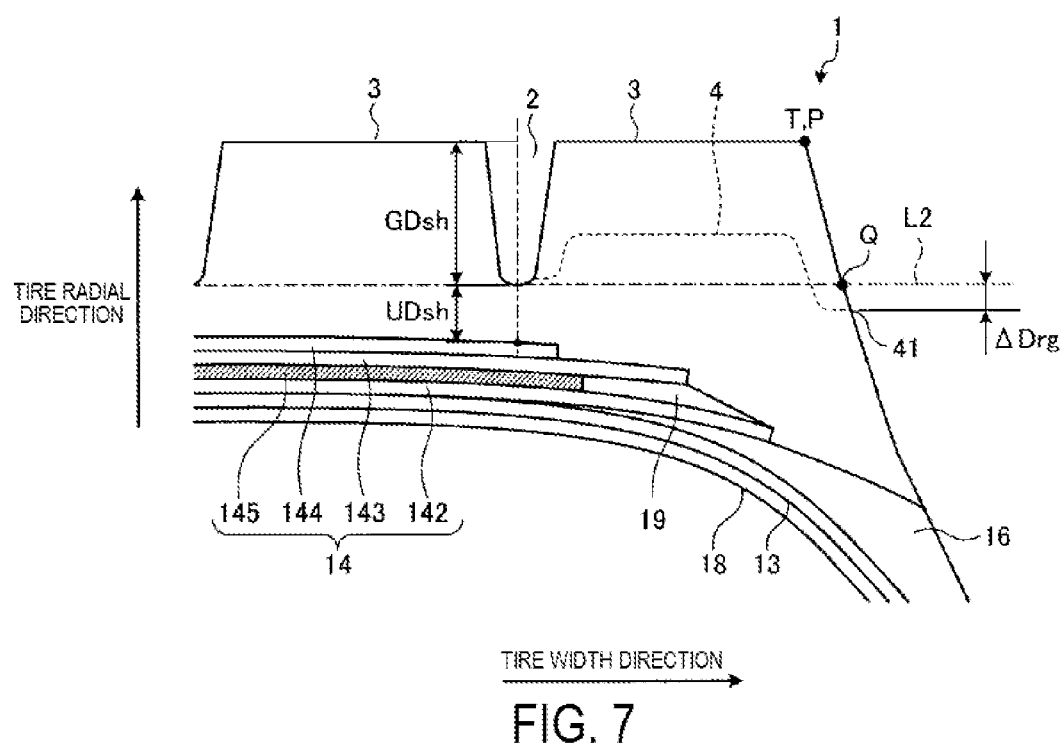
FIG. 7 is an enlarged cross-sectional view illustrating the shoulder portion of the pneumatic tire depicted in FIG. 1.

Also, as illustrated in FIG. 7, in a cross-sectional view in the tire meridian direction, a curved line L2 is drawn parallel to the tire profile passing through the groove bottom of the outermost circumferential main groove 2. Furthermore, the point of intersection of the curved line L2 and the buttress portion is Q.

In this case, all of the belt plies 142 to 145 from which the belt layer 14 is configured are on the inner side in the tire radial direction of the curved line L2. In particular, the edges of all the belt plies 142 to 145 on the outer side in the tire width direction from the outermost circumferential main groove 2 are on the inner side in the tire radial direction of the curved line L2. Accordingly, exposure of the belt layer 14 on the surface of the base tire is prevented during the buffing process.

Moreover, the groove bottom gauge UDsh of the outermost circumferential main groove 2 and the distance ΔDrg in the tire radial direction from the point of intersection Q to the opening end 41 of the lug groove 4 satisfy the relationship $-1.0 \leq \Delta Drg/UDsh \leq 1.0$, where the outer side in the tire radial direction is positive. Also, preferably the ratio ΔDrg/UDsh is set to satisfy the relationship $-1.0 \leq \Delta Drg/UDsh \leq 0$, and more preferably is set to satisfy the relationship $-0.5 \leq \Delta Drg/UDsh \leq -0.1$. In this way, by disposing the opening end 41 of the lug groove 4 on the inner side in the tire radial direction from the point of intersection Q, the tire retreading period is delayed, and primary life of the tire can be extended. Furthermore, by setting the ratio ΔDrg/UDsh within the range of $-1.0 \leq \Delta Drg/UDsh$ (and also $-0.5 \leq \Delta Drg/UDsh$), it is possible to determine with good accuracy whether or not to retread the tire.

Figure 8:
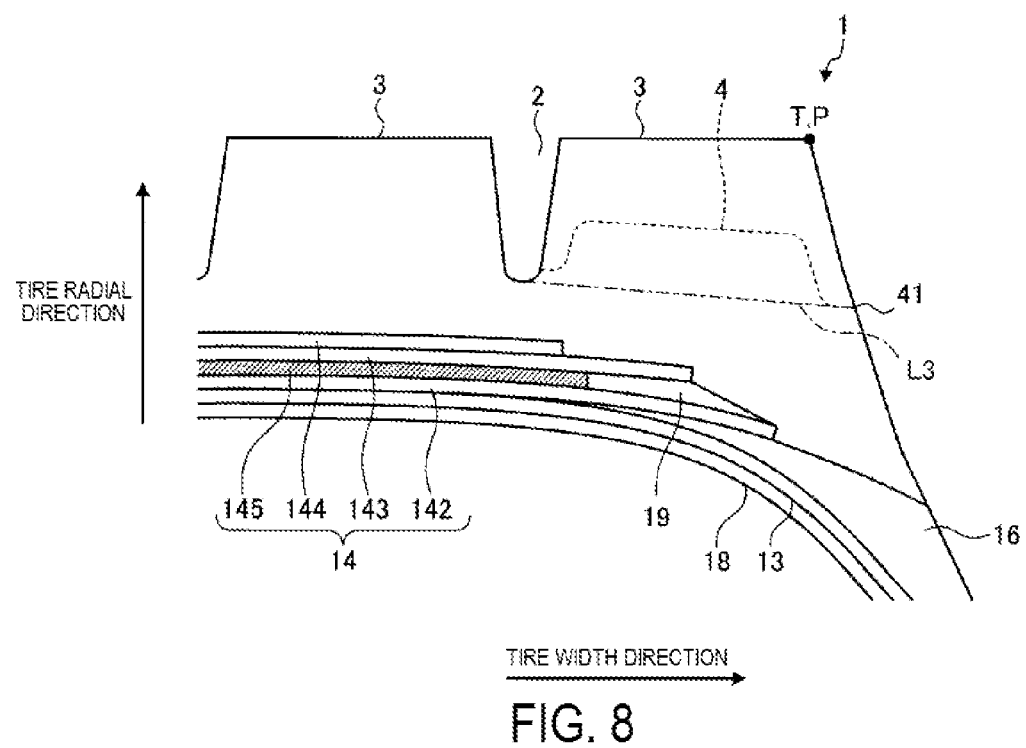
FIG. 8 is an enlarged cross-sectional view illustrating the shoulder portion of the pneumatic tire depicted in FIG. 1.

Moreover, as illustrated in FIG. 8, in the cross-sectional view in the tire meridian direction, a straight line L3 is drawn connecting the groove bottom of the outermost circumferential main groove 2 and the opening end 41 of the lug groove 4.

In this case, all of the belt plies 142 to 145 from which the belt layer 14 is configured are on the inner side in the tire radial direction of the straight line L3. Accordingly, exposure of the belt layer on the surface of the base tire during the buffing process is prevented.

Figure 9:
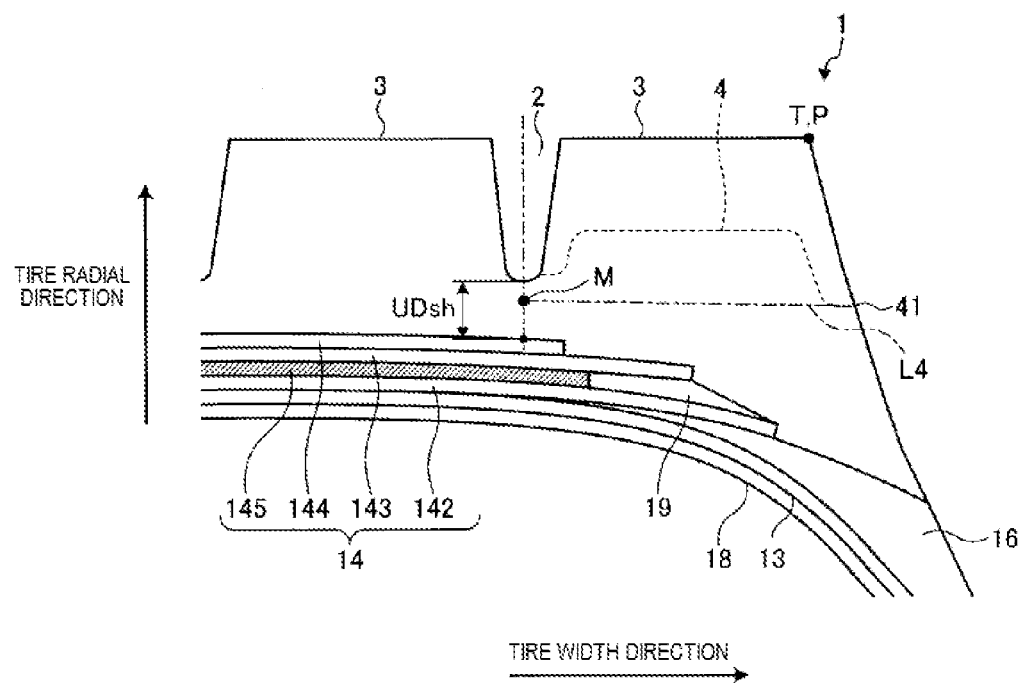
FIG. 9 is an enlarged cross-sectional view illustrating the shoulder portion of the pneumatic tire depicted in FIG. 1.

Also, as illustrated in FIG. 9, in a cross-sectional view in the tire meridian direction, a straight line L4 is drawn connecting the midpoint M of the groove bottom gauge UDsh of the outermost circumferential main groove 2 and the opening end 41 of the lug groove 4. The midpoint M of the groove bottom gauge UDsh is the midpoint between the two midpoints that define the groove bottom gauge UDsh.

In this case, all of the belt plies 142 to 145 from which the belt layer 14 is configured are on the inner side in the tire radial direction of the straight line L4. Accordingly, exposure of the belt layer 14 on the surface of the base tire is prevented during the buffing process.

Also, in FIG. 6, the groove depth GDsh and the groove bottom gauge UDsh of the outermost circumferential main groove 2 and the distance Drg in the tire radial direction from the tire ground contact edge T to the opening end 41 of the lug groove 4 satisfy the relationship $0.7 \leq Drg/(GDsh+UDsh) \leq 1.1$. Accordingly, it is possible to determine with good accuracy whether or not to retread the tire.

Figure 10:
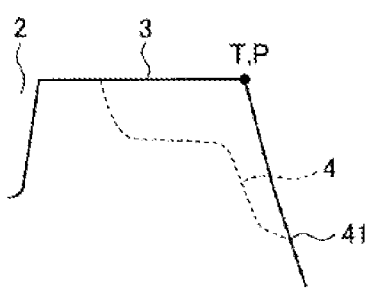
FIG. 10 is an explanatory view illustrating a modified example of the pneumatic tire depicted in FIG. 1.
Figure 11:
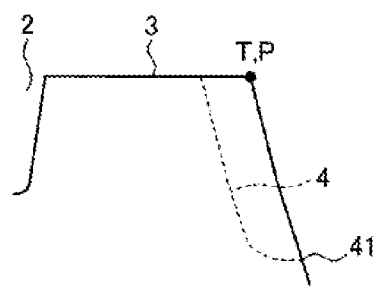
FIG. 11 is an explanatory view illustrating a modified example of the pneumatic tire depicted in FIG. 1.
Figure 12:
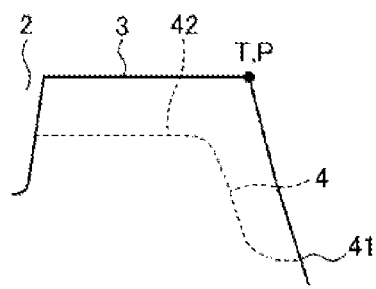
FIG. 12 is an explanatory view illustrating a modified example of the pneumatic tire depicted in FIG. 1.

FIGS. 10 to 12 are explanatory views illustrating modified examples of the pneumatic tire depicted in FIG. 1. These drawings illustrate modified examples of the lug groove 4 of the shoulder land portion 3.

In the configuration of FIG. 6, the lug groove 4 extends in the tire width direction passing through the shoulder land portion 3, and opening into the outermost circumferential main groove 2 and the buttress portion. The lug groove 4 also includes a raised bottom portion 42 within the shoulder land portion 3.

However, this not a limitation, and the lug groove 4 has an opening at least in the buttress portion. The opening end 41 of the lug groove 4 functions as a mark for determining the time for retreading the tire.

For example, as illustrated in FIG. 10, one end of the lug groove 4 may open to the buttress portion, and the other end may terminate within the shoulder land portion 3. Also, as illustrated in FIG. 11, the lug groove may be formed only in the buttress portion, and may extend from the tire ground contact edge T along the buttress portion on the inner side in the tire radial direction. Furthermore, as illustrated in FIG. 12, the lug groove 4 may open into the outermost circumferential main grooves 2 with the raised bottom portion 42 raised as it is.

[Round Shaped Shoulder Portions]

Figure 13:
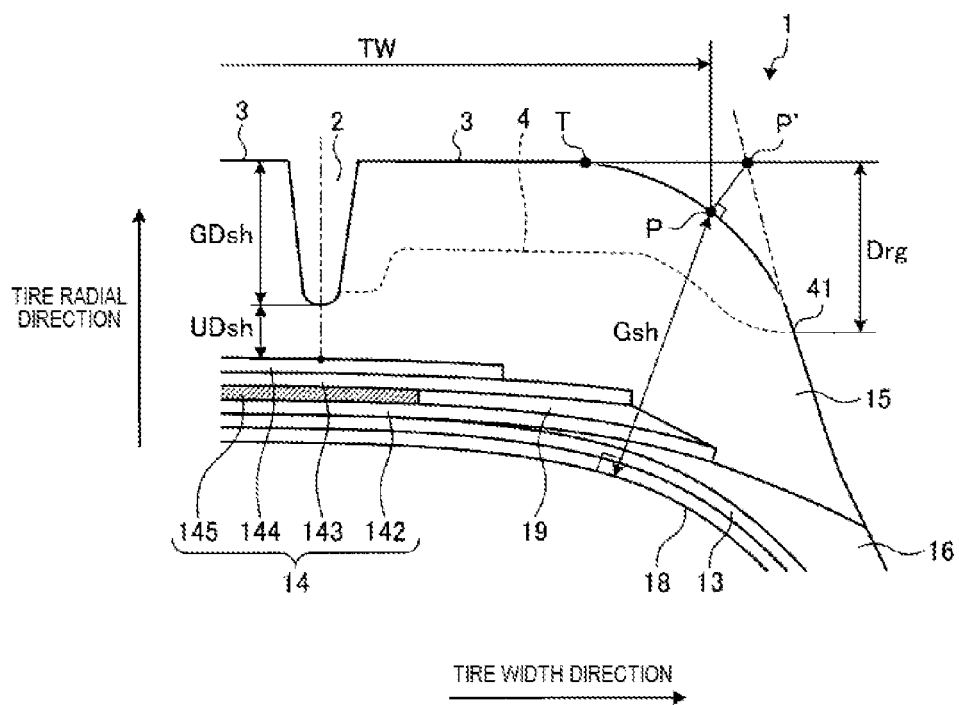
FIG. 13 is an explanatory view illustrating a modified example of the pneumatic tire depicted in FIG. 1.

FIG. 13 is an explanatory view of a modified example of the pneumatic tire depicted in FIG. 1. In this figure, a configuration having round shaped shoulder portions is depicted.

In the configuration of FIG. 1, the shoulder portions have a square shape as shown in FIG. 2, and the tire ground contact edge T coincides with the tread edge P. In other words, in the configuration having square shoulder portions, the points of the edge portions of the square shape are the tread edges P.

However, this is not a limitation, and the shoulder portions may have a round shape, as illustrated in FIGS. 4A and 4B. In this case, the intersection point of the tread portion profile and the side wall profile when viewed as a cross-section from the tire meridian direction is a point P', and the foot of the perpendicular line drawn from the intersection point P' to the shoulder portion is the tread edge P, as described above. Therefore, normally, the tire ground contact edge T and the tread edge P are different positions.

Also, in the configuration of FIG. 13, preferably the ratio Gsh/Gcc satisfies the range of $1.20 \leq Gsh/Gcc \leq 1.40$.

[Additional Data]

Moreover, in FIG. 1, the tread width TW and the tire total width SW have the relationship $0.83 \leq TW/SW \leq 0.95$. Also, the ratio TW/SW is preferably in the range of $0.85 \leq TW/SW \leq 0.93$.

The total tire width SW refers to a linear distance (including all portions such as letters and patterns on the tire surface) between the side walls when the tire is assembled on a regular rim and filled to a regular inner pressure and is in an unloaded state.

The tread width TW is the distance in the tire rotational axis direction between the left and right tread edges P, P, and measured when the tire is mounted on a regular rim and the regular inner pressure is applied under no load conditions.

Also, the tread width TW and the cross-sectional width Wca of the carcass layer 13 have the relationship $0.82 \leq TW/Wca \leq 0.92$.

The cross-sectional width Wca of the carcass layer 13 refers to a linear distance between the left and right maximum width positions of the carcass layer 13 when the tire is assembled on a standard rim and filled to a regular inner pressure and is in an unloaded state.

Also, in FIG. 3, preferably, the width Wb3 of the narrower cross belt (in FIG. 1, the outer-side cross belt 143) from among the inner-side cross belt 142 and the outer-side cross belt 143 and the width Ws of the circumferential reinforcing layer 145 have the relationship $0.70 \leq Ws/Wb3 \leq 0.90$. As a result, the width Ws of the circumferential direction reinforcing layer 145 can be properly secured.

The widths Wb2, Wb3 of the cross belts 142, 143 are measured as distances in the tire rotational axis direction of the left and right edges of each cross belt 142, 143 when the tire is assembled on a standard rim, inflated to a regular inner pressure, and no load is applied.

Also, in FIGS. 1 and 3, the width Wb2 of the wider cross belt (in FIG. 1, the inner-side cross belt 142) from among the inner-side cross belt 142 and the outer-side cross belt 143 and the cross-sectional width Wca of the carcass layer 13 have the relationship $0.73 \leq Wb2/Wca \leq 0.89$. Also, preferably, the ratio Wb2/Wca is within the range of $0.78 \leq Wb2/Wca \leq 0.83$.

Moreover, a width Ws of the circumferential reinforcing layer 145 and a cross-sectional width Wca of the carcass layer 13 have a relationship $0.60 \leq Ws/Wca \leq 0.70$.

In the pneumatic tire 1, as illustrated in FIG. 1, the width Ws of the circumferential reinforcing layer 145 preferably has the relationship $0.70 \leq Ws/TW \leq 0.90$ with respect to the tread width TW.

Also, as illustrated in FIG. 3, in the pneumatic tire 1, the circumferential reinforcing layer 145 is preferably disposed inward in the tire width direction from the left and right edges of the narrower cross belt (in FIG. 1, the outer-side cross belt 143) of the pair of cross belts (inner-side cross belt 142 and outer-side cross belt 143). Also, preferably, the width Wb3 of the narrower cross belt 143 and the distance S from the edge portion of the circumferential reinforcing layer 145 to the edge portion of the narrower cross belt 143 are in the range such that $0.03 \leq S/Wb3 \leq 0.12$. As a result, the distance between the end portions of the width Wb3 of the cross belt 143 and the end portions of the circumferential reinforcing layer 145 is properly secured. This point is the same even if the circumferential reinforcing layer 145 has a divided structure (not shown).

The distance S of the circumferential reinforcing layer 145 is measured as a distance in the tire width direction when the tire is assembled on a standard rim, inflated to a regular inner pressure, and no load is applied.

Also, in the configuration illustrated in FIG. 1, the circumferential reinforcing layer 145 is constituted from a single steel wire that is wound spirally, as illustrated in FIG. 3. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably not more than 12 mm. As a result, a plurality of wires (not less than 2 and not more than 5 wires) can be wound properly at a slant within a range of ±5 degrees with respect to the tire circumferential direction.

Also, the belt cords of the pair of cross belts 142, 143 are steel wire, and the pair of cross belts 142, 143 preferably has not less than 18 ends/50 mm and not more than 28 ends/50 mm, and more preferably has not less than 20 ends/50 mm and not more than 25 ends/50 mm. Also, the belt cords that constitute the circumferential reinforcing layer 145 are steel wire, and the circumferential reinforcing layer 145 preferably has not less than 17 ends/50 mm and not more than 30 ends/50 mm. As a result, the strengths of the belt plies 142, 143, 145 are properly secured.

Moreover, moduli E2, E3 at 100% elongation of the coating rubbers of the pair of cross belts 142, 143, and the modulus Es at 100% elongation of the coating rubber of the circumferential reinforcing layer 145 preferably have a relationship $0.90 \leq Es/E2 \leq 1.10$ and $0.90 \leq Es/E3 \leq 1.10$. Moreover, the modulus Es at 100% elongation of the coating rubber of the circumferential reinforcing layer 145 preferably is in the range of $4.5\ MPa \leq Es \leq 7.5\ MPa$. As a result, the moduli of the belt plies 142, 143, 145 are made appropriate.

The modulus at 100% elongation is measured in a tensile test at ambient temperature in conformance with JIS K6251 (using dumbbell no. 3).

Moreover, breaking elongations $\lambda 2$, $\lambda 3$ of the coating rubbers of the pair of cross belts 142, 143 are both preferably equal to or greater than 200%. Moreover, a breaking elongation Xs of the coating rubber of the circumferential reinforcing layer 145 is preferably equal to or greater than 200%. As a result, the durability of the belt plies 142, 143, 145 is properly secured.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min.

Elongation is preferably not less than 1.0% and not more than 2.5% when the tensile load of the belt cords as components that configure the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, in the pneumatic tire 1, preferably, the breaking elongation of the tread rubber 15 is in the range of not less than 400%, and more preferably not less than 450%. In this way the strength of the tread rubber 15 is ensured. There is no particular limitation on the upper limit of the breaking elongation of the tread rubber 15, but it is restricted by the type of rubber compound of the tread rubber 15.

Also, in the pneumatic tire 1, preferably, the hardness of the tread rubber 15 is in the range of not less than 60. In this way, the strength of the tread rubber 15 is appropriately ensured. There is no particular limitation on the upper limit of the hardness of the tread rubber 15, but it is restricted by the type of rubber compound of the tread rubber 15.

Here, "rubber hardness" refers to JIS-A hardness in accordance with JIS-K6263.

[Belt Edge Cushion Two-Color Structure]

Figure 14:
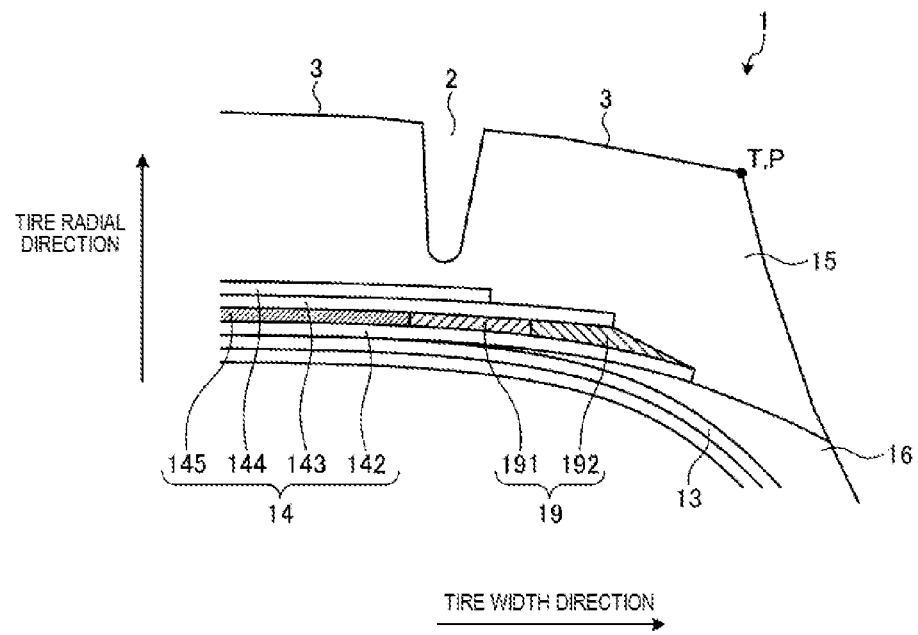
FIG. 14 is an explanatory view illustrating a modified example of the pneumatic tire depicted in FIG. 1.

FIG. 14 is an explanatory view of a modified example of the pneumatic tire depicted in FIG. 1. FIG. 5 is an enlarged view of an end portion of the belt layer 14 on the outer side in the tire width direction. In FIG. 5, the circumferential reinforcing layer 145 and the belt edge cushion 19 are indicated by hatching.

In the configuration illustrated in FIG. 1, the circumferential reinforcing layer 145 is disposed inward in the tire width direction of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

Conversely, in the configuration in FIG. 14, the belt edge cushion 19 in the configuration in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion of the circumferential reinforcing layer 145 on the outer side in the tire width direction to the edge portion of the pair of cross belts 142, 143.

Also, in the configuration in FIG. 14, the modulus Ein at 100% elongation of stress relief rubber 191 and the modulus Es at 100% elongation of the coating rubber of the circumferential reinforcing layer 145 have the relationship Ein<Es. Specifically, preferably the modulus Ein at 100% elongation of stress relief rubber 191 and the modulus Es at 100% elongation of the coating rubber of the circumferential reinforcing layer 145 have the relationship $0.6 \leq Ein/Es \leq 0.9$.

Moreover, the modulus Ein at 100% elongation of the stress relief rubber 191 and the modulus Eco at 100% elongation of the coating rubber of the cross belts 142, 143 satisfy the relationship of Ein<Eco in the configuration in FIG. 14. Specifically, the modulus Ein of the stress relief rubber 191 and the modulus Eco of the coating rubber preferably have a relationship such that $0.6 \leq Ein/Eco \leq 0.9$.

Also, in the configuration of FIG. 14, preferably the modulus Eout at 100% elongation of edge stress relief rubber 192 and the modulus Ein at 100% elongation of the stress relief rubber 191 have the relationship Eout<Ein. Additionally, the modulus Ein at 100% elongation of the stress relief rubber 191 preferably is within a range of $4.0 \text{ MPa} \leq Ein \leq 5.5 \text{ MPa}$.

Since the stress relief rubber 191 is disposed on the outer side of the circumferential reinforcing layer 145 in the tire width direction in the configuration of FIG. 14, shearing strain of the periphery rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

[Configuration Having the Supplemental Belt as the Innermost Layer]

Figure 15:
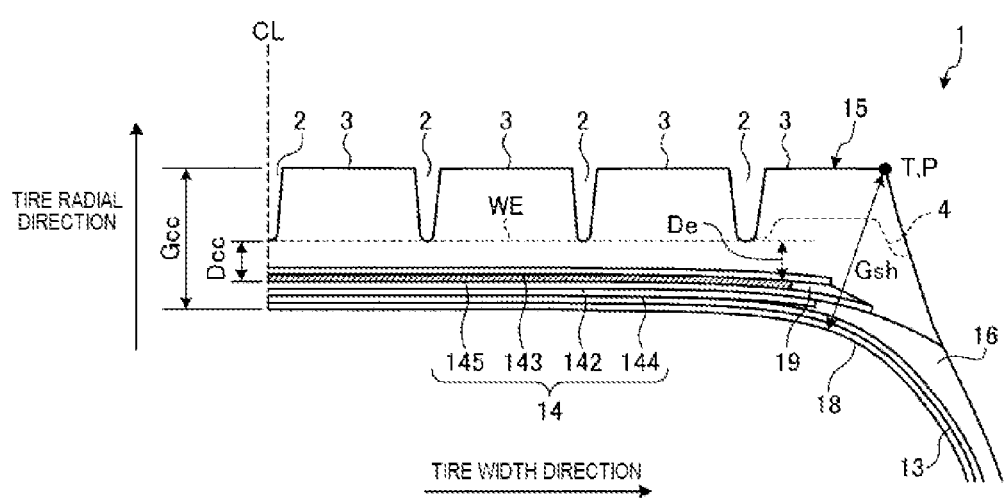
FIG. 15 is an explanatory view illustrating a modified example of the pneumatic tire depicted in FIG. 1.

FIG. 15 is an explanatory view of a modified example of the pneumatic tire depicted in FIG. 1. FIG. 15 illustrates the area on one side of a tread portion demarcated by the tire equatorial plane CL.

In the configuration of FIG. 1, as illustrated in FIGS. 2 and 3, the supplemental belt 144 is placed in the outermost layer of the belt layer 14. Therefore, the inner-side cross belt 142 is disposed on the innermost layer of the belt layer 14, adjacent to the carcass layer 13.

However, this is not a limitation, and the supplemental belt 144 may be sandwiched between the carcass layer 13 and the inner-side cross belt 142, and disposed adjacent to them. In other words, the belt layer 14 is configured so that in the configuration of FIG. 6, the supplemental belt 144 is disposed on the outer periphery of the carcass layer 13, and the inner-side cross belt 142 is laminated on the outer periphery of the supplemental belt 144, and circumferential reinforcing layer 145 and the outer-side cross belt 143 are laminated in that order on the outer periphery of the inner-side cross belt 142.

[Effect]

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). The pneumatic tire 1 also includes the three circumferential main grooves 2 extending in the tire circumferential direction and the plurality of land portions 3 partitioned by the circumferential main grooves 2. Also, the belt layer 14 includes the inner-side cross belt 142 and the outer-side cross belt 143 having an absolute value of belt angle with respect to the tire circumferential direction of not less than 46 degrees and not more than 80 degrees and having belt angles with signs that are different from each other; and the circumferential reinforcing layer 145 having a belt angle with respect to the tire circumferential direction within the range of ±5 degrees and disposed between the inner-side cross belt 142 and outer-side cross belt 143 (see FIGS. 2 and 3). Also, the distance Gcc on the tire equatorial plane CL from the tread profile to the tire inner circumferential surface and the distance Gsh from the tread edge P to the tire inner circumferential surface satisfy the relationship $1.10 \leq Gsh/Gcc$.

In this configuration, the pair of cross belts 142, 143 function as a high angle belt, maintaining the stiffness in the tire width direction. Also, the circumferential reinforcing layer 145 and the supplemental belt 144 function as a low angle belt, maintaining the stiffness in the tire circumferential direction. Accordingly, the balance of stiffness in the tire circumferential direction and the tire width direction is appropriately adjusted, so that deformation of the tread portion with time is reduced. Accordingly, the yield of base tires when retreading tires is increased, which has the advantage that the tire retreading performance is improved.

In particular, in the configuration as described above, the pair of cross belts 142, 143 functions as a high angle belt, so it is possible to eliminate other high angle belts (for example, belt plies having an absolute value of a belt angle of not less than 45 degrees and not more than 70 degrees, and disposed between the carcass layer and the inner-side cross belt). Accordingly, there is an advantage that the tire weight can be reduced.

Also, in the configuration as described above, the circumferential reinforcing layer 145 is disposed between the inner-side cross belt 142 and the outer-side cross belt 143, so that the pair of cross belts 142, 143 having belt angles that are greatly inclined with respect to the tire width direction and the circumferential reinforcing layer 145 having a belt angle that is greatly inclined with respect to the tire circumferential direction are alternately stacked in the tire radial direction. Therefore, compared with, for example, a configuration (not shown) in which the circumferential reinforcing layer is disposed on the inner side in the tire radial direction or on the outer side in the tire radial direction of the pair of cross belts, the stiffness distribution in the tire radial direction between these belt plies 142, 143, 145 is more uniform. Accordingly, there is an advantage that the tire belt durability is improved.

Also, in the configuration as described above, the shoulder portion has a thick structure with a large ratio $Gsh/Gcc$ (within the range of $1.10 \leq Gsh/Gcc$), so that when the used tire is being retreaded, it is possible to prevent exposure of belt plies while appropriately ensuring the amount of buffing. Accordingly, there is an advantage that the yield of base tires is improved. Also, because the shoulder portion has a thick structure, it is possible to appropriately remove the shoulder portion wear by buffing, even when the shoulder wear of the used tire is extensive, and this is desirable.

Also, in the pneumatic tire 1, the distances $Dcc$, $De$ of the circumferential reinforcing layer 145 with respect to the ultimate wear surface WE are appropriately adjusted, so that compared with a configuration in which the ratio $De/Dcc$ is substantially equivalent, the ground contact surface pressure of the shoulder land portion 3 when the tire makes ground contact is increased. Also, radial growth of the tire in the region to the outer side in the tire width direction of the circumferential reinforcing layer 145 is reduced, so that deformation of the belt layer 14 is reduced. Hereby, exposure of the belt layer 14 during buffing of the used tire is reduced, which has an advantage that the yield of base tires is increased.

Also, in the pneumatic tire 1, the groove depth $GDsh$ and the groove bottom gauge $UDsh$ of the left and right circumferential main grooves (outermost circumferential main grooves) 2 on the outermost side in the tire width direction satisfy the relationship $0.20 \leq UDsh/GDsh$. In this configuration, since the groove bottom gauges $UDsh$ of the circumferential main grooves 2 are appropriately ensured, a sufficient amount of buffing can be obtained so that the shoulder wear of the used tire does not remain on the surface of the base tire. Accordingly, there is an advantage that the yield of base tires is improved.

Also, in the pneumatic tire 1, the width $Wb2$ of the inner-side cross belt 142 is greater than the width $Wb3$ of the outer-side cross belt 143 (see FIGS. 2 and 3). Hereby, the durability of the belt layer 14 is ensured, which has the advantage that the fastening effect of the belt layer 14 can be effectively exhibited.

Also, in the pneumatic tire 1, the groove depth $GDcc$ and the groove bottom gauge $UDcc$ of the circumferential main groove 2 closest to the tire equatorial plane CL satisfy the relationship $0.15 \leq UDcc/GDcc$ (see FIG. 5). In this configuration, since the groove bottom gauge $UDcc$ of the circumferential main groove 2 is appropriately ensured, a sufficient amount of buffing can be obtained so that the shoulder wear of the used tire does not remain on the surface of the base tire. Accordingly, there is an advantage that the yield of base tires is improved.

Also, in the pneumatic tire 1, the lug groove 4 that opens in the buttress portion is provided in the shoulder land portion 3 (see FIG. 6). Also, in a cross-sectional view in the tire meridian direction, when a straight line L1 is drawn from that edge from among the edges of the plurality of belt plies 142 to 145 from which the belt layer 14 is configured on the outermost side in the tire radial direction and on the outer side in the tire width direction from the outermost circumferential main groove 2 and parallel to the tire rotational axis, the opening end 41 of the lug groove 4 is on the outer side in the tire radial direction of the straight line L1. In this configuration, when the opening end 41 of the lug groove 4 is used as a mark for determining the time for retreading the tire, exposure of the edges of the belt plies on the surface of the base tire during buffing is prevented. Accordingly, there is an advantage that the yield of base tires is improved.

Also, in the pneumatic tire 1, in the cross-sectional view in the tire meridian direction, when the curved line L2 is drawn parallel to the tire profile and passing through the groove bottom of the outermost circumferential main groove 2, all the belt plies 141 to 145 from which the belt layer 14 is configured are on the inner side in the tire radial direction of the curved line L2 (see FIG. 7). Hereby, exposure of the edges of the belt plies on the surface of the base tire during buffing is prevented, which has the advantage that the yield of the base tires is improved.

Also, in the pneumatic tire 1, when the point of intersection of the curved line L2 as described above and the buttress portion is Q, the groove bottom gauge $UDsh$ of the outermost circumferential main groove 2 and the distance $\Delta Drg$ in the tire radial direction from the point of intersection Q to the opening end 41 of the lug groove 4 satisfy the relationship $-1.0 \leq \Delta Drg/UDsh \leq 1.0$ (see FIG. 7). In this configuration, when the opening end 41 of the lug groove 4 is used as a mark for determining the time for retreading the tire, there is an advantage that the position of the opening end 41 of the lug groove 4 is appropriately adjusted. In other words, by satisfying the relationship $\Delta Drg/UDsh \leq 1.0$, the tire retreading period is delayed, and primary life of the tire can be extended. By satisfying the relationship $-1.0 \leq \Delta Drg/UDsh$, it is possible to determine with good accuracy whether or not to retread the tire.

Also, in the pneumatic tire 1, in the cross-sectional view in the tire meridian direction, when the straight line L3 is drawn connecting the groove bottom of the outermost circumferential direction 2 and the opening end 41 of the lug groove 4, all the belt plies 141 to 145 from which the belt layer 14 is configured are on the inner side in the tire radial direction of the straight line L3 (see FIG. 8). Hereby, exposure of the edges of the belt plies on the surface of the base tire during buffing is prevented, which has the advantage that the yield of the base tires is improved.

Also, in the pneumatic tire 1, in the cross-sectional view in the tire meridian direction, when the straight line L4 is drawn connecting the midpoint M of the groove bottom gauge UDsh of the outermost circumferential groove 2 and the opening end 41 of the lug groove 4, all the belt plies 141 to 145 from which the belt layer 14 is configured are on the inner side in the tire radial direction of the straight line L4 (see FIG. 9). Hereby, exposure of the edges of the belt plies on the surface of the base tire during buffing is prevented, which has the advantage that the yield of the base tires is improved.

Also, in the pneumatic tire 1, the groove depth GDsh and the groove bottom gauge UDsh of the outermost circumferential main groove 2 and the distance Drg in the tire radial direction from the tire ground contact edge T to the opening end 41 of the lug groove 4 satisfies the relationship $0.7 \leq Drg/(GDsh+UDsh) \leq 1.1$ (see FIG. 6). In this configuration, when the opening end 41 of the lug groove 4 is used as a mark for determining the time for retreading the tire, the position of the opening end 41 is appropriately adjusted. Hereby, there is an advantage that it is possible to determine with good accuracy whether or not to retread the tire.

Also, in the pneumatic tire 1, the left and right edges of the circumferential reinforcing layer 145 are on the outer side in the tire width direction of the left and right circumferential main grooves on the outermost side in the tire width direction (outermost circumferential main grooves) 2, 2 (see FIGS. 1 and 2). In this configuration, the circumferential reinforcing layer 145 extends to below the groove of the outermost circumferential main groove 2, so that growth of the tire diameter at the outermost circumferential main groove 2 is reduced. Hereby, the groove bottom gauge UDsh of the outermost circumferential main groove 2 is ensured, so that a sufficient amount of buffing can be obtained, which has the advantage that the yield of base tires is improved.

Also, in the pneumatic tire 1, the width Ws of the circumferential reinforcing layer 145 satisfies the relationship $0.70 \leq Ws/TW \leq 0.90$ with respect to the tread width TW (see FIG. 1). In this configuration, by appropriately adjusting the ratio Ws/TW, the amount of deformation of the shoulder land portion 3 when the tire makes ground contact is effectively reduced (see FIG. 4B). Hereby, the deformation of the tread portion with time is reduced, which has the advantage that the yield of base tires during retreading is improved. In other words, by satisfying the relationship $0.70 \leq Ws/TW$, the width Ws of the circumferential reinforcing layer 145 is appropriately ensured, so that the amount of deformation of the shoulder land portion 3 when the tire makes ground contact is reduced. Also, by satisfying the relationship $Ws/TW \leq 0.90$, the deformation of the edges of each of the belt plies when the tire makes ground contact is reduced, so that the strain in the edges of each of the belt plies is reduced.

Also, in the pneumatic tire 1, the width Ws of the circumferential reinforcing layer 145 and the cross-sectional width Wca of the carcass layer 13 satisfy the relationship $0.60 \leq Ws/Wca \leq 0.70$ (see FIG. 1). In this configuration, by appropriately adjusting the width Ws of the circumferential reinforcing layer 145, the balance of stiffness in the tire circumferential direction and the tire width direction is appropriately adjusted. Hereby, the deformation of the tread portion with time is reduced, which has the advantage that the yield of base tires during retreading is improved.

Additionally, in the pneumatic tire 1, the tread width TW and the cross-sectional width Wca of the carcass layer 13 satisfy the relationship $0.82 \leq TW/Wca \leq 0.92$ (see FIG. 1). In such a configuration, radial growth in the center region is suppressed due to the belt layer 14 having the circumferential reinforcing layer 145. Furthermore, a difference in radial growths between the center region and a shoulder region is alleviated and the ground contact pressure distribution in a tire width direction is made uniform due to the ratio TW/Wca being within the above range. As a result, there is an advantage that the tire ground contact pressure is made more uniform. That is, the air volume inside the tire is secured and deformation is suppressed due to TW/Wca being not less than 0.82. By making TW/Wca not less than 0.92, rising of the shoulder portion is reduced and the ground contact pressure distribution is made more uniform.

Also, in the pneumatic tire 1, the laminate made from the inner-side cross belt 142, the outer-side cross belt 143, the circumferential reinforcing layer 145, and the supplemental belt 144 (in FIGS. 2 and 3, the belt layer 14) is disposed adjacent to the carcass layer 13 (see FIGS. 2 and 3). In this configuration, compared with a configuration having, for example, a large angle belt (absolute value of belt angle not less than 45 degrees and not more than 70 degrees) between the laminate and the carcass layer, it is possible to eliminate one belt ply while maintaining the same function, which has the advantage that the tire mass can be reduced.

Also, in the pneumatic tire 1, the belt cords that constitute the circumferential reinforcing layer 145 are steel wire, and the circumferential reinforcing layer 145 has the ends of not less than 17 ends/50 mm and not more than 30 ends/50 mm. As a result, there is an advantage that the effect of suppressing radial growth in the center region is properly secured due to the circumferential reinforcing layer 145.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. As a result, there is an advantage that the effect of reducing radial growth in the tread portion center region is properly ensured due to the circumferential reinforcing layer 145.

In the pneumatic tire 1, elongation is not less than 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly secured due to the circumferential reinforcing layer 145.

Furthermore, in the pneumatic tire 1, the circumferential reinforcing layer 145 is disposed inward in the tire width direction from the left and right edges of the narrower cross belt (in FIG. 1, the outer-side cross belt 143) of the pair of cross belts (inner-side cross belt 142 and outer-side cross belt 143) (see FIG. 3). The pneumatic tire 1 includes the stress relief rubber 191 disposed between the pair of cross belts 142, 143 and at a position on the outer side of the circumferential reinforcing layer 145 in the tire width direction and flanking the circumferential reinforcing layer 145, and the edge portion relief rubber 192 disposed between the pair of cross belts 142, 143 and at a position on the outer side of the stress relief rubber 191 in the tire width direction and corresponding to the edge portions of the pair of cross belts 142, 143 (see FIG. 14).

In such a configuration, there is an advantage that fatigue rupture of the periphery rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the periphery rubber of the circumferential reinforcing layer 145 is suppressed.

Also, in the pneumatic tire 1, the modulus Ein at 100% elongation of the stress relief rubber 191 and the modulus Eco at 100% elongation of the coating rubber of the pair of cross belts (inner-side cross belt 142 and outer-side cross belt 143) satisfy the relationship Ein<Eco (see FIG. 14). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Also, in the pneumatic tire 1, the modulus Ein at 100% elongation of the stress relief rubber 191 and the modulus Eco at 100% elongation of the coating rubber of the pair of cross belts (inner-side cross belt 142 and outer-side cross belt 143) satisfy the relationship $0.60 \leq Ein/Eco \leq 0.90$ (see FIG. 14). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Additionally, in the pneumatic tire 1, the modulus Ein at 100% elongation of the stress relief rubber 191 is in range of $4.0 \text{ MPa} \leq Ein \leq 5.5 \text{ MPa}$ (see FIG. 14). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Furthermore, in the pneumatic tire 1, the circumferential reinforcing layer 145 is disposed inward in the tire width direction from the left and right edges of the narrower cross belt (in FIG. 1, the outer-side cross belt 143) of the pair of cross belts (inner-side cross belt 142 and outer-side cross belt 143) (see FIG. 1). Moreover, preferably, the width Wb3 of the narrower cross belt 143 and the distance S from the edge portion of the circumferential reinforcing layer 145 to the edge portion of the narrower cross belt 143 are in the range of $0.03 \leq S/Wb3 \leq 0.12$ (see FIG. 3). In this way, there is the advantage in that the positional relationship S/Wb3 between the edges of the cross belts 142, 143 and the edges of the circumferential reinforcing layer 145 is appropriately adjusted. In other words, by satisfying the relationship $0.03 \leq S/Wb3$, the distance between the edge of the circumferential reinforcing layer 145 and the edge of the cross belt 143 is appropriately ensured, and separation of the rubber around the edges of these belt plies 145, 143 is reduced. Also, by satisfying the relationship $S/Wb3 \leq 0.12$, the width Ws of the circumferential reinforcing layer 145 with respect to the width Wb3 of the cross belt 143 is ensured, so that the fastening effect of the circumferential reinforcing layer 145 is appropriately ensured.

[Target of Application]

The pneumatic tire 1 is preferably applied to a heavy duty tire with an aspect ratio of not less than 40% and not more than 75% when assembled on a regular rim, inflated with the regular inner pressure and the regular load is applied. A heavy duty tire has a higher load under use than a passenger car tire. Thus, a radial difference occurs easily between the region where the circumferential reinforcing layer is disposed and the regions on the outer side of the circumferential reinforcing layer in the tire width direction. Moreover, a ground contact shape having an hourglass shape occurs easily in the tire having the above-mentioned low aspect ratio. Therefore, by applying the present technology to heavy duty tires, the action and effect of the circumferential reinforcing layer 145 can be significantly obtained.

EXAMPLES

FIGS. 16A-16B and 17A-17B are tables showing results of performance testing of pneumatic tires according to embodiments of the present technology.

Evaluation of the potential for retreading a plurality of mutually different pneumatic tires were conducted in the performance tests. In these evaluations, test tires with tire size 315/60R22.5 were assembled onto a rim of size 22.5"×9.00", and an air pressure of 900 kPa was applied to these tires.

Also, the test tires were fitted to a 4×2 tractor trailer test vehicle which was driven, and 100 test tires of each specification that were worn to the opening of the lug groove on the shoulder land portion were obtained. A buffing process was carried out on these test tires, visual inspection was carried out to detect exposure of the belt plies on the surface of the base tires and to detect residual groove bottom line of the circumferential main grooves. In these evaluations, higher scores were preferable. In particular, when the evaluation was 80% or higher, the result was deemed to be sufficiently superior to the Conventional Example, and when the evaluation was 85% or higher, the result was deemed to be significantly superior.

The test tires 1 of Working Example 1 had the configuration illustrated in FIGS. 1 to 3. Also, the main groove dimensions were set to TW=275 mm, Gcc=32.8 mm, GDcc=13.0 mm, GDsh=13.5 mm. Also, as illustrated in FIG. 7, each of the belt plies of the belt layer 14 are on the inner side in the tire width direction of the virtual line L2 drawn from the groove bottom of the outermost circumferential main groove 2. Also, Working Example 2 to Working Example 28 are modified examples of test tire 1 of Working Example 1.

The test tire of the Conventional Example had the configuration in FIGS. 1 to 3 without the circumferential reinforcing layer 145. Also, a high angle belt having a belt angle of 60 degrees was provided between the inner-side cross belt 142 and the carcass layer 13. Therefore, the belt layer 14 had a structure in which four belt plies were laminated. Also, the pair of cross belts 142, 143 had a belt angle towards the tire circumferential direction (45 degrees or less).

As shown in the test results, the test tires of Working Examples 1 to 28 had improved tire belt edge separation performance and improve yield of base tires.

What is claimed is:

1. A pneumatic tire, comprising:
   a carcass layer;
   a belt layer disposed on an outer side in a tire radial direction of the carcass layer, the belt layer including an inner-side cross belt and an outer-side cross belt each having an absolute value of a belt angle with respect to the tire circumferential direction of greater than 60 degrees and not more than 80 degrees and having the belt angles with signs that are opposite to each other; a circumferential reinforcing layer having a belt angle with respect to the tire circumferential direction of not less than ±5 degrees, disposed between the inner-side cross belt and the outer-side cross belt and a distance Gcc on a tire equatorial plane from a tread profile to a tire inner circumferential surface, and a distance Gsh from a tread edge to the tire inner circumferential surface satisfying a relationship 1.10≤Gsh/Gcc;
   a supplemental belt having an absolute value of a supplemental belt angle with respect to the tire circumferential direction of not less than 10° and not more than 45° and being disposed laminated on the outer side in the tire radial direction of the outer-side cross belt, the absolute value of the supplemental belt angle of the supplemental belt being smaller than the absolute value of the belt angle of the inner-side cross belt and the outer-side cross belt and being larger than the absolute value of the belt angle of the circumferential reinforcing layer, the supplemental belt angle and belt angle of the outer-side cross belt having signs that are opposite to each other, and the supplemental belt extending in the tire width direction beyond a tire equational plane;
   tread rubber disposed on the outer side in the tire radial direction of the belt layer;
   at least three circumferential main grooves extending in a tire circumferential direction; and
      a plurality of land portions partitioned by the circumferential main grooves.

2. The pneumatic tire according to claim 1, wherein in a cross-sectional view in a tire meridian direction, when an ultimate wear surface WE of the circumferential main grooves is drawn, a distance Dcc on the tire equatorial plane from the circumferential reinforcing layer to the ultimate wear surface WE, and a distance De from an edge of the circumferential reinforcing layer to the ultimate wear surface WE satisfy a relationship 1.06≤De/Dcc.

3. The pneumatic tire according to claim 2, wherein a groove depth GDsh and a groove bottom gauge UDsh of left and right circumferential main grooves on an outermost side in a tire width direction satisfy a relationship 0.20≤UDsh/GDsh.

4. The pneumatic tire according to claim 3, wherein a width Wb2 of the inner-side cross belt is greater than a width Wb3 of the outer-side cross belt.

5. The pneumatic tire according to claim 4, wherein a groove depth GDcc and a groove bottom gauge UDcc of the circumferential main groove closest to the tire equatorial plane satisfy a relationship 0.15≤UDcc/GDcc.

6. The pneumatic tire according to claim 5, wherein when left and right circumferential main grooves on outermost sides in a tire width direction from among the circumferential main grooves are referred to as the outermost circumferential main grooves, and the land portions on the outer side in the tire width direction of left and right outermost circumferential main grooves are shoulder land portions,
   the shoulder land portions include a lug groove opening to a buttress portion, and
   in a cross-sectional view in the tire meridian direction, when a straight line L1 is drawn from the edge from among the edges of a plurality of belt plies from which the belt layer is configured on an outermost side in the tire radial direction and on the outer side in the tire width direction of the outermost circumferential main groove parallel to a tire rotational axis,
   an opening end of the lug groove is on the outer side in the tire radial direction of the straight line L1.

7. The pneumatic tire according to claim 1, wherein a groove depth GDsh and a groove bottom gauge UDsh of left and right circumferential main grooves on an outermost side in a tire width direction satisfy a relationship 0.20≤UDsh/GDsh.

8. The pneumatic tire according to claim 1, wherein a width Wb2 of the inner-side cross belt is greater than a width Wb3 of the outer-side cross belt.

9. The pneumatic tire according to claim 1, wherein a groove depth GDcc and a groove bottom gauge UDcc of the circumferential main groove closest to the tire equatorial plane satisfy a relationship 0.15≤UDcc/GDcc.

10. The pneumatic tire according to claim 1, wherein when left and right circumferential main grooves on outermost sides in a tire width direction from among the circumferential main grooves are referred to as the outermost circumferential main grooves, and the land portions on the outer side in the tire width direction of left and right outermost circumferential main grooves are shoulder land portions,
    the shoulder land portions include a lug groove opening to a buttress portion, and
    in a cross-sectional view in a tire meridian direction, when a straight line L1 is drawn from the edge from among the edges of a plurality of belt plies from which the belt layer is configured on an outermost side in the tire radial direction and on the outer side in the tire width direction of the outermost circumferential main groove parallel to a tire rotational axis,
    an opening end of the lug groove is on the outer side in the tire radial direction of the straight line L1.

11. The pneumatic tire according to claim 1, wherein in a cross-sectional view in a tire meridian direction, when a curved line L2 is drawn parallel to the tire profile and passing through a groove bottom of an outermost circumferential main groove,
    all belt plies from which the belt layer is configured are on the inner side in the tire radial direction of the curved line L2.

12. The pneumatic tire according to claim 11, wherein shoulder land portions include a lug groove opening to a buttress portion, and
    when a point of intersection of the curved line L2 and the buttress portion is Q,
    a groove bottom gauge UDsh of the outermost circumferential main groove and a distance ΔDrg in the tire radial direction from a point of intersection Q to an opening end of the lug groove satisfy a relationship −1.0≤ΔDrg/UDsh ≤1.0, where the outer side in the tire radial direction is positive.

13. The pneumatic tire according to claim 1, wherein shoulder land portions include a lug groove opening to a buttress portion, and
    in a cross-sectional view in a tire meridian direction, when a straight line L3 is drawn connecting a groove bottom of an outermost circumferential direction and an opening end of the lug groove, all belt plies from which the belt layer is configured are on the inner side in the tire radial direction of the straight line L3.

14. The pneumatic tire according to claim 13, wherein shoulder land portions include a lug groove opening to a buttress portion, and a groove depth GDsh and a groove bottom gauge UDsh of an outermost circumferential main groove and a distance Drg from a tire ground contact edge T to an opening end of the lug groove satisfy a relationship 0.7≤Drg/(GDsh+UDsh)≤1.1.

15. The pneumatic tire according to claim 1, wherein shoulder land portions include a lug groove opening to a buttress portion, and in a cross-sectional view in a tire meridian direction, when a straight line L4 is drawn connecting a midpoint M of a groove bottom gauge UDsh of an outermost circumferential groove and an opening end of the lug groove, all belt plies from which the belt layer is configured are on the inner side in the tire radial direction of the straight line L4.

16. The pneumatic tire according to claim 1, wherein left and right edges of the circumferential reinforcing layer are on the outer side in a tire width direction of left and right circumferential main grooves on an outermost side in the tire width direction.

17. The pneumatic tire according to claim 1, wherein a tread width TW and a width Ws of the circumferential reinforcing layer satisfy a relationship 0.70≤Ws/TW≤0.90.

18. The pneumatic tire according to claim 1, wherein a width Ws of the circumferential reinforcing layer and a width Wca of the carcass layer satisfy a relationship 0.60≤Ws/Wca≤0.70.

19. The pneumatic tire according to claim 1, wherein a tread width TW and a cross-sectional width Wca of the carcass layer satisfy a relationship 0.82≤TW/Wca≤0.92.

20. The pneumatic tire according to claim 1, wherein a laminate made from the inner-side cross belt, the outer-side cross belt, the circumferential reinforcing layer, and the supplemental belt is disposed adjacent to the carcass layer.

21. The pneumatic tire according to claim 1, wherein the inner-side cross belt and the outer-side cross belt each have an absolute value of the belt angle with respect to the tire circumferential direction of not less than 70 degrees and not more than 80 degrees and have the belt angles with signs that are opposite to each other.

22. The pneumatic tire according to claim 1, wherein a width Wb3 of a narrower cross belt from among the inner-side cross belt and the outer-side cross belt and a width Ws of the circumferential reinforcing layer have a relationship 0.70≤Ws/Wb3≤0.90.

23. The pneumatic tire according to claim 1, wherein a tread width TW and a width Ws of the circumferential reinforcing layer satisfy a relationship 0.70≤Ws/TW≤0.80.

24. The pneumatic tire according to claim 1, wherein:

a groove depth GDsh and a groove bottom gauge UDsh of left and right circumferential main grooves on an outermost side in a tire width direction satisfy a relationship 0.20≤UDsh/GDsh;

a groove depth GDcc and a groove bottom gauge UDcc of the circumferential main groove closest to the tire equatorial plane satisfy a relationship 0.15≤UDcc/GDcc; and UDsh/GDsh and UDcc/GDcc satisfy a relationship UDcc/GDcc<UDsh/GDsh.

25. A pneumatic tire, comprising: a carcass layer; a belt layer disposed on an outer side in a tire radial direction of the carcass layer; tread rubber disposed on the outer side in the tire radial direction of the belt layer; at least three circumferential main grooves extending in a tire circumferential direction; and a plurality of land portions partitioned by the circumferential main grooves, the belt layer including an inner-side cross belt and an outer-side cross belt each having an absolute value of a belt angle with respect to the tire circumferential direction of not less than 46 degrees and not more than 80 degrees and having the belt angles with signs that are opposite to each other; and a circumferential reinforcing layer having a belt angle with respect to the tire circumferential direction of not less than ±5 degrees, disposed between the inner-side cross belt and the outer-side cross belt, and a distance Gcc on a tire equatorial plane from a tread profile to a tire inner circumferential surface, and a distance Gsh from a tread edge to the tire inner circumferential surface satisfying a relationship 1.10≤Gsh/Gcc;

wherein a groove depth GDsh and a groove bottom gauge UDsh of left and right circumferential main grooves on an outermost side in a tire width direction satisfy a relationship 0.20≤UDsh/GDsh; a groove depth GDcc and a groove bottom gauge UDcc of the circumferential main groove closest to the tire equatorial plane satisfy a relationship 0.15≤UDcc/GDcc; and UDsh/GDsh and UDcc/GDcc satisfy a relationship UDcc/GDcc<UDsh/GDsh.

\* \* \* \* \*